United States Patent
Kollu et al.

(10) Patent No.: US 9,608,891 B2
(45) Date of Patent: Mar. 28, 2017

(54) PROVIDING SIMULTANEOUS DATA CALLS FOR CLIENT DEVICES ON A PLURALITY OF SUBSCRIPTIONS OF A MULTI-SIM COMPUTING DEVICE CONFIGURED WITH SOFTWARE-ENABLED ACCESS POINT FUNCTIONALITY

(71) Applicant: QUALCOMM Incorporated, San Diego, CA (US)

(72) Inventors: Tirumala Rama Rao Kollu, Hyderabad (IN); Chaitanya Pratapa, Hyderabad (IN); Uday Kumar Arava, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 271 days.

(21) Appl. No.: 14/499,309

(22) Filed: Sep. 29, 2014

(65) Prior Publication Data

US 2016/0094662 A1     Mar. 31, 2016

(51) Int. Cl.
*G06F 15/16* (2006.01)
*H04L 12/26* (2006.01)
(Continued)

(52) U.S. Cl.
CPC ........ *H04L 43/0882* (2013.01); *H04L 45/745* (2013.01); *H04W 48/18* (2013.01); *H04L 61/2514* (2013.01); *H04W 84/12* (2013.01)

(58) Field of Classification Search
CPC . H04L 67/141; H04L 43/0882; H04L 45/745; H04L 43/04; H04L 61/2514; H04W 48/18; H04W 88/06; H04W 84/005
(Continued)

(56) References Cited

U.S. PATENT DOCUMENTS 8,213,306 B1 *   7/2012   Boch ................... H04L 1/0084
                                                                    370/230
2002/0176579 A1   11/2002   Deshpande et al.
(Continued)

OTHER PUBLICATIONS

International Search Report and Written Opinion—PCT/US2015/047681—ISA/EPO—Nov. 24, 2015.

*Primary Examiner* — Bryan Lee
(74) *Attorney, Agent, or Firm* — The Marbury Law Group, PLLC

(57) ABSTRACT

Methods, devices, non-transitory processor-readable storage media for mapping different local area network (LAN) connections to different data subscriptions of a software-enabled access point (softAP) computing device. A method executed by a softAP computing device processor may include storing a mapping that associates each in a plurality of LAN connections for the LAN established by the softAP computing device with one of a plurality of wide area network (WAN) connections, connecting a client device to the LAN via one of the plurality of LAN connections, routing data traffic received from the client device to one of the plurality of WAN connections based on the stored mapping, and routing data traffic received via one of the plurality of WAN connections to the client device based on the stored mapping. The softAP computing device may also perform re-routing of data traffic based on whether WAN connections are out-of-service or have bandwidth availability.

25 Claims, 14 Drawing Sheets

(51) Int. Cl.
*H04L 12/741* (2013.01)
*H04W 48/18* (2009.01)
*H04L 29/12* (2006.01)
*H04W 84/12* (2009.01)

(58) Field of Classification Search
USPC .......................................................... 709/224
See application file for complete search history.

(56) References Cited

U.S. PATENT DOCUMENTS

| | | | |
|---|---|---|---|
| 2003/0035397 A1 | 2/2003 | Haller et al. | |
| 2003/0051041 A1 | 3/2003 | Kalavade et al. | |
| 2004/0053599 A1 | 3/2004 | Karaoguz et al. | |
| 2005/0260972 A1 | 11/2005 | Karaoguz et al. | |
| 2006/0126613 A1* | 6/2006 | Zweig ................ | H04L 12/5692 370/389 |
| 2007/0133548 A1* | 6/2007 | Kim ....................... | H04L 45/00 370/392 |
| 2008/0293404 A1* | 11/2008 | Scherzer ............... | H04W 84/18 455/426.1 |
| 2009/0064299 A1* | 3/2009 | Begorre ................ | H04W 12/12 726/7 |
| 2011/0149720 A1* | 6/2011 | Phuah ................ | H04L 12/2697 370/216 |
| 2013/0223230 A1* | 8/2013 | Swaminathan ....... | H04W 76/02 370/241 |
| 2014/0250513 A1* | 9/2014 | Cao ......................... | H04L 63/08 726/7 |
| 2015/0016260 A1* | 1/2015 | Chow .................... | H04L 45/22 370/235 |
| 2015/0131430 A1* | 5/2015 | Chan .................... | H04W 76/064 370/217 |
| 2015/0208279 A1* | 7/2015 | Lindoff ................ | H04W 88/06 370/235 |

\* cited by examiner

PROVIDING SIMULTANEOUS DATA CALLS FOR CLIENT DEVICES ON A PLURALITY OF SUBSCRIPTIONS OF A MULTI-SIM COMPUTING DEVICE CONFIGURED WITH SOFTWARE-ENABLED ACCESS POINT FUNCTIONALITY

BACKGROUND

Computing devices, such as smartphones, tablet computers, and laptop computers, often include resources for conducting communications over a plurality of radio access technologies ("RATs") and/or radio access networks, such as Long Term Evolution (LTE) networks and Global System for Mobile Communications (GSM) networks. Such computing devices may include radio-frequency (RF) communication circuits or "RF resources" for providing access to separate networks via a plurality of RATs, each RAT associated with a network subscription and/or subscriber identity module (SIM). For example, a first subscription (e.g., a GSM cellular network subscription) may use a transceiver of the computing device to transmit to a GSM base station, and may use the transceiver to transmit to an LTE base station via a second subscription (e.g., a LTE SIM). Computing devices supporting a plurality of subscriptions are often referred to as multi-SIM computing devices. Certain multi-SIM computing devices, referred to as Multi-Subscription, Multi-Active (MSMA) devices, may be configured with a plurality of individual radio resources enabling concurrent data transmissions on more than one subscription. For example, a Dual-Subscription, Dual-Active (DSDA) device may support two simultaneous data calls on two different subscriptions.

Computing devices may also be configured to act as software access points (or "softAPs") to provide Internet access to other devices. In particular, a computing device configured to act as a softAP or mobile router may be capable of providing a connection to various cellular/mobile networks and/or the Internet to various client devices via a local area network (LAN) established by the computing device. In other words, computing devices may provide a wide area network (WAN) backhaul for client devices. For example, a softAP computing device may route data traffic in between a connected smartphone client device and an LTE mobile network. A softAP computing device may configure the LAN with a plurality of LAN connections for the client devices to connect to, such as a plurality of service set identifiers (SSIDs). For example, some client devices may connect to a first or a second SSID (e.g., a primary SSID, a guest SSID, etc.) in order to utilize the connectivity of the softAP computing device.

Regardless of softAP and multiple subscription functionalities of a computing device, conventional softAP computing devices may only provide client devices Internet access for data calls on a single, default data subscription. In other words, despite the potential for using numerous active WAN connections, conventional softAP devices may, by default, cause bandwidth of a single default subscription to be shared between multiple client device groups (or SSIDs). For example, when two SSIDs are used to provide Internet access to client devices over a single subscription (e.g., an LTE Category 4 (CAT4) subscription) that provides 50 Mbps of bandwidth, each SSID (or group of client devices) may only each utilize 25 Mbps of bandwidth. Thus, all client devices of the softAP computing device's connectivity (e.g., primary or guest) are provided Internet access on the same, default data subscription with a limited bandwidth. Such a default data subscription may be set by providers, or alternatively, an implementation of the computing device may define the data subscription. This may be a problem for efficiently using the more than one data subscription of the softAP computing device amongst various users. For example, users might want to choose a subscription that can provide better data rates and/or reduced cost. As another example, the softAP computing device may use the maximum bandwidth of the default data subscription without using the available bandwidth of the non-default subscription.

SUMMARY

Various embodiments provide methods, devices, and non-transitory processor-readable storage media for mapping local area network (LAN) connections of a LAN to wide area network (WAN) connections corresponding to subscriptions of a softAP computing device.

Embodiment methods that may be performed by a processor of the softAP computing device may include storing a mapping that associates each of a plurality of LAN connections for the LAN established by the softAP computing device with one of a plurality of WAN connections, connecting a client device to the LAN via one of the plurality of LAN connections, routing data traffic received from the client device to one of the plurality of WAN connections based on the stored mapping, and routing data traffic received via the one of the plurality of WAN connections to the client device based on the stored mapping. In some embodiments, the methods may further include determining whether the one of the plurality of WAN connections is out-of-service, updating a common Internet protocol (IP) address to include an IP address of a subscription for another of the plurality of WAN connections that is in-service in response to determining that the one of the plurality of WAN connections is out-of-service, transmitting the data traffic received from the client device to the another of the plurality of WAN connections that is in-service using the updated common IP address, filtering the data traffic received via the another of the plurality of WAN connections based on a base address of the client device, and transmitting the filtered data traffic to the client device. In some embodiments, determining whether one of the plurality of WAN connections is out-of-service may be based on a notification received from a modem of the softAP computing device.

In some embodiments, the methods may further include determining whether the one of the plurality of WAN connections has returned to being in-service, and in response updating the common Internet protocol (IP) address to include the IP address of the subscription for the one of the plurality of WAN connections that has returned to being in-service. In some embodiments, determining whether one of the plurality of WAN connections has returned to being in-service may be based on a notification received from a modem of the softAP computing device.

In some embodiments, the methods may further include monitoring bandwidth availability of the plurality of WAN connections, determining whether to re-route data to another of the plurality of WAN connections based on the monitored bandwidth availability, updating a common Internet protocol (IP) address to include an IP address of a subscription for another of the plurality of WAN connections in response to determining to re-route the data based on the monitored bandwidth availability of the another of the plurality of WAN connections, transmitting the data traffic received from the client device to the another of the plurality of WAN connections using the updated common IP address, filtering the data traffic received via the another of the plurality of WAN connections based on a base address of the client device, and transmitting the filtered data traffic to the client device. In some embodiments, monitoring bandwidth availability of the plurality of WAN connections may include evaluating events from one of a user space daemon or a kernel. In some embodiments, methods may further include de-activating resources associated with the one of the plurality of WAN connections in response to determining to re-route the data based on the monitored bandwidth availability of the another of the plurality of WAN connections.

In some embodiments, determining whether to re-route the data to the another of the plurality of WAN connections based on the monitored bandwidth availability may include comparing a number of client devices connected to the plurality of LAN connections to threshold values related to the plurality of WAN connections to determine whether any of the plurality of WAN connections is being underused or overused, and determining that the data should be re-routed to the another of the plurality of WAN connections based on a result of the comparisons. In some embodiments, the methods may further include updating the common Internet protocol (IP) address to include the IP address of the subscription for the one of the plurality of WAN connections in response to determining not to re-route the data based on the monitored bandwidth availability of the another of the plurality of WAN connections. In some embodiments, the methods may further include activating the resources associated with the one of the plurality of WAN connections in response to determining not to re-route the data based on the monitored bandwidth availability of the another of the plurality of WAN connections.

In some embodiments, the methods may further include throttling the data traffic received from the client device based on characteristics of the another of the plurality of WAN connections. In some embodiments, the methods may further include billing the client device at a rate based on the one of the plurality of LAN connections. In some embodiments, the methods may further include storing authorization data indicating LAN connections of the plurality of LAN connections that are available to the client device, wherein connecting the client device to the LAN via the one of the plurality of LAN connections is permitted by the stored authorization data.

Embodiment methods for a softAP computing device to improve experiences of client devices connected to various service set identifiers (SSIDs) may be performed by a processor of the softAP computing device and may include bringing up, via a MobileAP router configuration module executing on the processor of the softAP computing device, backhauls on a plurality of wireless wide area network (WWAN) subscriptions, associating a different WWAN interface to a modem of the softAP computing device with each of the plurality of WWAN subscriptions, assigning a different public Internet protocol (IP) address to the different WWAN interface associated with each of the plurality of WWAN subscriptions, and enabling network address translation (NAT) on the different WWAN interface associated with each of the plurality of WWAN subscriptions such that any packet transmitted on the different WWAN interface associated with each of the plurality of WWAN subscriptions is configured via the network address translation to contain as a source IP address the different public IP address of the different WWAN interface associated with each of the plurality of WWAN subscriptions. The method may further include creating, via a kernel of the softAP computing device, a network address translation entry used for downlink traffic, enabling a first service set identifier (SSID) and a second SSID, associating the first SSID and the second SSID with different wireless local area network (WLAN) interfaces, and assigning private IP addresses to each of the client devices, routing packets from the first SSID to a first WWAN subscription of the plurality of WWAN subscriptions and packets from the second SSID to a second WWAN subscription of the plurality of WWAN subscriptions using policy-based routes that associate the WLAN interfaces with WWAN interfaces of the plurality of WWAN subscriptions. The method may further include, receiving a first indication from the modem that one of the first WWAN subscription and the second WWAN subscription has gone out-of-service, bringing down a call corresponding to the one of the first WWAN subscription and the second WWAN subscription that has gone out-of-service and its corresponding WWAN interface, and modifying the policy-based routes to route packets associated with a WLAN interface associated with the one of the first WWAN subscription and the second WWAN subscription that has gone out-of-service over an active subscription of the first WWAN subscription and the second WWAN subscription. The method may further include using standard traffic control mechanisms to maintain quality of service (QOS). The method may further include receiving a second indication from the modem that the one of the first WWAN subscription and the second WWAN subscription that had gone out-of-service is now active, bringing up a backhaul on the one of the first WWAN subscription and the second WWAN subscription that had gone out-of-service but is now active, and modifying the policy-based routes to route the packets associated with the WLAN interface through the one of the first WWAN subscription and the second WWAN subscription that had gone out-of-service but is now active.

Various embodiments may include a computing device configured with processor-executable instructions to perform operations of the methods described above. Various embodiments may include a computing device having means for performing functions of the operations of the methods described above. Various embodiments may include non-transitory processor-readable media on which are stored processor-executable instructions configured to cause a processor of a computing device to perform operations of the methods described above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
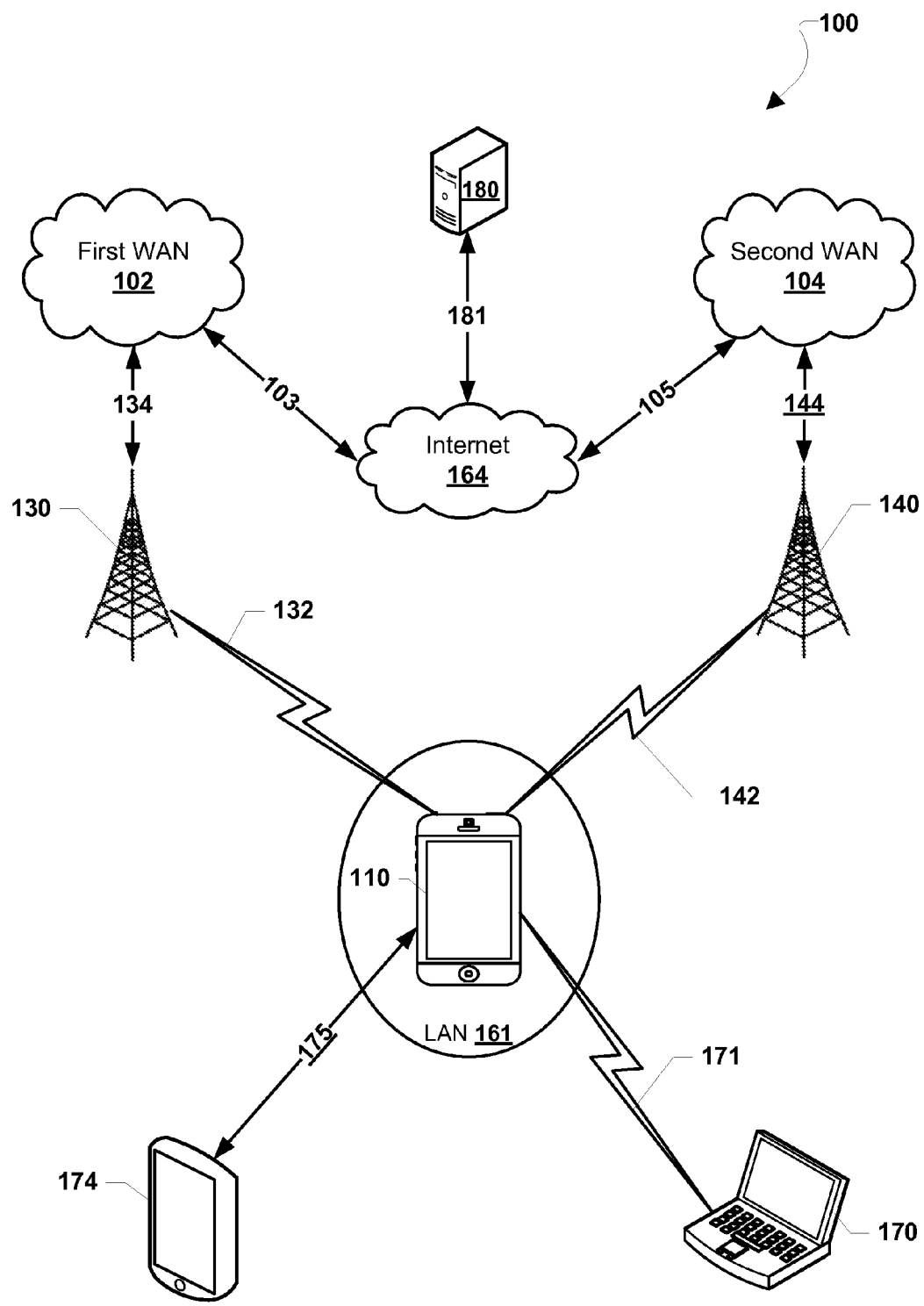
FIG. 1 is a communication system block diagram of a communication network suitable for use with various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The term "computing device" is used herein to refer to any one or all of cellular telephones, smart-phones, web-pads, tablet computers, Internet-enabled cellular telephones, Wi-Fi enabled electronic devices, personal data assistants (PDA's), laptop computers, personal computers, and similar electronic devices equipped with at least a processor and configured with a network transceiver to establish a wide area network (WAN) and/or a local area network (LAN) connection (e.g., an LTE, 3G or 4G wireless wide area network transceiver, a wired connection to the Internet, or Wi-Fi). Mobile devices may be computing devices configured to be easily moved from place to place, such as a smartphone, laptop, or tablet device.

The terms "software-enabled access point computing device" and "softAP computing device" are used herein to refer to computing devices configured to execute various software, instructions, applications, routines, and/or operations for operating as mobile routers capable of establishing both WAN connections and LAN connections for enabling client devices to communicate with a WAN, essentially functioning as an access point router. For example, a softAP computing device may be a smartphone configured to operate as a wireless router (e.g., mobile Wi-Fi router) for providing other smartphones access to a cellular network via LAN connections to the softAP computing device.

In various embodiments, computing devices functioning as softAP computing devices may be configured with one or more subscriptions and associated resources (e.g., radio chains, SIMs, etc.) for exchanging data with one or more WAN networks. In particular, a softAP computing device may be a multi-SIM device configured to concurrently exchange data over a plurality of subscriptions and/or radio access technologies (RATs). In other words, the softAP computing device may be a multi-subscription, multi-active device (or MSMA), that may include any number of simultaneously active subscriptions (e.g., dual-active, tri-active, quad-active, etc.). For example, a softAP computing device may be a dual-subscription, dual-active (DSDA) device configured to simultaneously transmit data traffic on a first subscription associated with an LTE cellular network and a second subscription associated with a GSM cellular network.

Various embodiments provide methods, devices, systems, and non-transitory processor-readable storage media for mapping different LAN connections (e.g., SSIDs) to different data subscriptions (or RATs) of a softAP computing device. The different LAN connections (e.g., SSIDs) may be associated with different services and characteristics, allowing client devices connected to the softAP computing device to exchange data with wide area networks at different data rates and costs. For example, in some implementations the softAP computing device may provide users of client devices with a choice of either fast, expensive Internet access via a first WAN connection (e.g., an LTE connection) mapped to a first SSID of the softAP computing device's LAN, or slow, cheap access to the Internet via a second WAN connection (e.g., a GSM connection) mapped to a second SSID of the LAN. Such mapping techniques improve the performance and functioning of the softAP computing device by enabling better utilization of the bandwidth available between the computing device's multiple subscriptions, and provide additional functionality by allowing client devices to conduct data calls simultaneously on multiple subscriptions merely by choosing different ways to connect to the softAP computing device's LAN. With different LAN connections (e.g., different SSIDs) associated with subscriptions of different RATs, the embodiment techniques enable client devices to control their Internet access per their preference of data rates and cost. The functioning of the softAP computing device may also be improved via the embodiment techniques by increasing the total bandwidth available for carrying concurrent data flows increases as may occur when client devices utilize a plurality of subscriptions concurrently for Internet access. For example, in a DSDA configuration, overall bandwidth may be the sum of bandwidths from the first and second subscriptions (e.g., LTE and GSM subscriptions).

In various embodiments, the softAP computing device may be configured or provisioned with a user (or operator) configuration that maps a first SSID (e.g., a "primary access" SSID) to a first data subscription (or SIM) and a second SSID (e.g., a "guest access" SSID) to a second data subscription (or SIM). The mapping may be accomplished with administrator privileges on the softAP computing device. Client devices that connect to the first SSID may submit data traffic that may be routed by the softAP computing device so that the data is sent to the Internet (or other external network) using the first subscription. Similarly, client devices that connect to the second SSID may submit data traffic that may be routed by the softAP computing device so that it is sent to the Internet (or other external network) using the second subscription. For example, in an implementation of a softAP computing device in a university setting, the first SSID may be a "privileged" SSID for use only by professors that provides high data rates for data calls on an LTE network, and the second SSID may be a "normal" SSID for student use that provides minimum performance for data calls on a GSM network. Credentials or other authorizations for logging into the various SSIDs may be predetermined by an administrator or owner of the softAP computing device.

In various embodiments, the softAP computing device may perform routing and re-routing of data associated with client devices via a softAP module (or "softAP router configuration module" or "MobileAP router configuration module"). In other words, the softAP module may be executed by a processor of the softAP computing device to establish backhauls for WAN subscriptions. For example, the softAP module may be an application, service, instruction set, routines, circuitry, and/or other operations that access stored data (e.g., data tables of mappings) to determine associations between SSIDs and subscriptions of the softAP computing device in order to route incoming (or downlink) data traffic received from remote WAN sources or outgoing (uplink) data traffic received from client device via LAN connections.

Implementations of the various embodiments may be used in various scenarios that may involve various types of client devices with different requirements of Internet access via a softAP computing device. For example, softAP computing devices according to various embodiments may be useful for education institutes, offices, libraries, theatres and restaurants etc., in which the access points may provide one SSID for primary client devices (e.g., admin, employees, professors, etc.) and another SSID for guest client devices (e.g., diners/customers, students, pedestrians, etc.). As another example, a first SSID that is associated with a fast or high-bandwidth subscription (e.g., LTE, WCDMA, etc.) may be offered to customers of a restaurant for a fee, while access to a second SSID that is associated with a slower subscription (e.g., GSM) may be provided free to customers. In this way, customers who want a fast Internet experience can log-in with the first SSID and pay the fee, and those who only want to browse while waiting for their meal can log-in with the second SSID for free.

In some embodiments, the softAP computing device may evaluate the available services for the various subscriptions to identify out-of-service conditions. In response to determining that a particular subscription is out of service, the softAP computing device may perform operations to re-route data traffic associated with the out-of-service subscription to another subscription in order to avoid a loss of connectivity by client devices using or associated with the out-of-service subscription. In other words, the softAP may temporarily remap uplink and downlink data traffic related to client devices previously using the out-of-service subscription. This capability may be particularly useful for mobile softAP computing devices because subscriptions may go into- and out-of-service as the device moves (e.g., in a car or train). For example, in response to receiving a kernel event indicating that a first subscription has going out-of-service, the softAP computing device may begin appending data related to a second subscription (e.g., a new IP address) to data traffic received from client devices connected to the SSID associated with the first subscription and may transmit the data traffic using the second subscription. As another example, incoming data traffic from a cellular network via a first subscription may be evaluated by the softAP computing device to identify the destination client device connected to the LAN via an SSID associated with the second subscription that is currently out-of-service. When service is re-established with a previously out-of-service subscription, the softAP computing device may re-route data traffic back to the originally-intended subscription, such as by using stored data to identify the client devices that were temporarily swapped and adjusting associated data traffic to again indicate the intended subscription IP address. In this way, the softAP computing device may provide a seamless experience so that client devices may not completely lose connectivity when their associated subscription loses service in the softAP computing device so long as there is available bandwidth with a WAN connection via another subscription of the softAP computing device.

In some embodiments, the softAP computing device may evaluate the use of various subscriptions and identify periods during which data flows from various subscriptions may be re-routed to under-used subscriptions. In other words, the softAP computing device may implement bandwidth sharing techniques between subscriptions. For example, based on activity data and/or bandwidth availability assessments of a first subscription, the softAP computing device may re-route data traffic related to a second subscription to a WAN connection of the first subscription. Such re-routing may enable the softAP computing device to temporarily de-activate resources, thus improving the functioning of the softAP computing device by reducing power consumption when data traffic can be supported with fewer radio resources. In some embodiments, the softAP computing device may calculate billing or costs differently for client devices based on the LAN connection they originally connected to instead of the subscription (or WAN connection) they actually use when the softAP computing device redirects data traffic for its own purposes. In some embodiments, in order to maintain the quality and/or characteristics of a WAN connection of a certain subscription, the softAP computing device may throttle or otherwise impede the use of the subscription by re-routed data. For example, to preserve fairness or contractual obligations, when data traffic related to a slow GSM subscription is re-routed to a faster LTE subscription, the softAP computing device may reallocate, limit, or downgrade the bandwidth available to the GSM data traffic so that the data traffic of client devices intentionally using the LTE subscription are not degraded.

In various embodiments, the softAP computing device may utilize information from various modules, operating system threads, or daemons to determine whether to consolidate or re-route data traffic to WAN connections, such as due to out-of-service conditions or to improve network resource use via bandwidth sharing. In particular, the softAP computing device may utilize information from encountered events to keep track of the number and identity of client devices that are connected to or disconnected from the various LAN connections of the softAP computing device at a given time. Such information may be used to determine whether connections are in service, underused by client devices, or overused by client devices.

In some embodiments, the softAP computing device may utilize data regarding access point and authentication servers provided by a hostapd user space daemon and/or wireless LAN (WLAN)-related data or events from the hostapd, such as via a 'hostapd_cli' user space daemon. Using hostapd_cli, the softAP computing device may receive events that indicate when a LAN client device becomes connected to or disconnected from a LAN connection supported by the softAP computing device. For example, the softAP computing device may encounter or be notified of a 'AP-STA-CONNECTED' event that is generated whenever a client device is connected to a LAN connection (e.g., an SSID). As another example, the softAP computing device may encounter or be notified of a 'AP-STA-DISCONNECTED' event that is generated whenever a client device disconnects from a LAN connection (e.g., an SSID) and that may indicate the client device's MAC address. Such events may include various identifying information about the client device including, for example, the media access control (MAC) address of the client device, the interface (SSID) that the client device is connected to, etc.

In some embodiments, the softAP computing device may encounter or be notified of events generated and/or conveyed via a kernel (or operating system) in response to the addition or deletion of entries to a kernel neighbor table (e.g., a Linux kernel table). For example, the softAP computing device may encounter or be notified of a 'RTM_NEWNEIGH' event generated by the kernel when a neighbor cache is updated, such as by the addition of an IPV4/IPV6 address, or an 'RTM_DELNEIGH' event generated by the kernel when an entry is deleted from the neighbor cache. In some embodiments, the softAP computing device may receive kernel events (e.g., "RTM_NEWLINK" event, "RTM_DELLINK" event) indicating whether a LAN client device has connected or disconnected from a USB connection to the softAP mobile computing device.

In some embodiments, the softAP computing device may execute the following example algorithm to provide uninterrupted services to client devices associated with out-of-service WAN connections. The softAP computing device (via its softAP module or "softAP" router configuration module) may associate various WAN connections (or their subscriptions) with different interfaces to a modem such that each interface is assigned a different Public IP address. Network Address Translation (NAT) functionalities may be enabled on each WAN connection (or wireless WAN (WWAN) interface) that allow logical mappings between LAN connections to WAN connections (e.g., NAT44, NAT64, etc.). For example, stored information (or NAT entries) may indicate the association between a first WAN connection (e.g., an LTE subscription) and a first LAN connection (e.g., a first SSID). With this, any packet that leaves the softAP computing device via a WAN connection (or interface) may indicate a "source" IP address that corresponds to the Public IP address assigned to that WAN connection. Further, NAT entries may be generated and stored (via the kernel of the softAP computing device) that may be used for incoming (i.e., downlink) traffic. For example, the softAP computing device (via its softAP module) may associate different SSIDs with different LAN interfaces (e.g., a 'wlan0' interface, a 'wlan1' interface, etc.). Various client devices may be assigned Private IP addresses. The softAP computing device may use a routing policy to route packets from different SSIDs to corresponding WAN connections based on which the LAN connection (or interface) the packets are received. For example, packets received on a 'wlan0' interface (i.e., via an SSID linked to the 'wlan0' interface) may be routed over a certain WAN connection (e.g., a GSM subscription) and packets received on a 'wlan1' interface may be routed over a second WAN connection (e.g., an LTE subscription).

When one of the WAN connections (and thus its corresponding subscription) goes out-of-service, the softAP computing device (via the softAP module) may receive an indication from its modem indicating that the subscription has gone out-of-service. In response, the softAP computing device may bring down calls corresponding to that out-of-service subscription. The softAP computing device may modify a policy (e.g., stored instructions, mappings, etc.) that indicates that data traffic (e.g., packets) associated with the out-of-service subscription may be routed to another, still active subscription/WAN connection, thereby avoiding disruption of service for client devices. Eventually, when the softAP computing device receives an indication from the modem indicating that the out-of-service subscription has regained service (e.g., the out-of-service subscription is now active), the softAP computing device may bring up the backhaul on that once again active subscription and modify the policy to again route packets from client devices connected to the associated LAN connection through the originally-assigned subscription. In some embodiments, quality of service (QOS) of an out-of-service subscription may be maintained using standard traffic control mechanisms.

Bandwidth sharing may be accomplished with the following example algorithm, enabling the softAP computing device to save network resources by avoiding bringing up calls on a WAN connection corresponding to a LAN connection having no (or too few) connected client devices. In response to receiving notifications that client devices have connected to LAN connections (e.g., receiving a 'RTM_NEWNEIGH' event, a "RTM_NEWLINK" event, a 'AP_STA_CONNECTED' event), the softAP computing device may identify the various LAN connections (e.g., SSIDs) to client devices that are connected to the device at a given time. For example, the softAP computing device may maintain a stored table of entries that indicate client devices and the SSID to which they are connected. When fewer than a predefined threshold number of client devices are connected to a particular LAN connection, the softAP computing device (via a softAP module) may de-activate that subscription (and its WAN connection) and use another active subscription (and WAN connection) for those client devices' data traffic as long as the WAN connection of the another active subscription is sufficient to support the client devices' requirements (e.g., QOS requirements). When the softAP computing device determines that the bandwidth on the another active WAN connection is no longer sufficient for all of the connected client devices, the softAP computing device may re-activate the de-activated subscription and utilize previous routing policies to route packets to/from LAN connections and WAN connections. In some embodiments, the number of client devices that may be supported on one subscription may be determined based on the bandwidth available on that subscription and a minimum limit of bandwidth used by each client device. These parameters may be configurable by administrators.

In some embodiments, client devices may include a user interface (UI) for dynamic connection to (or switches between) various LAN connections supported by the softAP computing device. For example, a user may provide touch inputs on a touch screen of a client device presenting a graphical user interface in order to cause the client device to connect to the softAP computing device via a first or second SSID, and thus obtain WAN access via the first or second subscriptions of the softAP computing device. Such user interfaces may provide information describing the characteristics of the subscriptions mapped to various LAN connections to enable users of client devices to better choose appropriate connections to the softAP computing device. For example, the user interface may indicate that the first SSID is associated with a fast LTE connection that costs more than a second SSID associated with a slower GSM network. In this way, client devices may dynamically control the subscription of the softAP computing device that is used to transmit data in order to suit their networking needs and preferences at a given time.

The various embodiments may improve the functioning of a softAP computing device by enabling dynamic use of various WAN connections of supported subscriptions. This ability to separate data traffic between WAN connections/subscriptions and LAN connections to client devices may benefit the softAP computing device by providing a platform for segregating and managing data flow workloads. By re-routing data traffic away from out-of-service subscriptions to in-service subscriptions, the softAP computing device may be improved in its ability to continuously provide WAN access to various client devices. Further, embodiments may benefit the functioning of the softAP computing device by conserving power by proactively de-activating resources and re-routing data traffic to use subscriptions with WAN connections that have available bandwidth.

For simplicity, various descriptions herein may refer to a first and second client device, subscription, WAN connection, and/or LAN connection. However, it should be appreciated that the embodiment techniques may be used to route data corresponding to any number of client devices, subscriptions, WAN connections, and/or LAN connections. For example, when the softAP computing device is configured with three independent radio chains, the various embodiment methods described herein may be performed to concurrently route data from a plurality of LAN connections (e.g., SSIDs) to three WAN connections enabled by the three radio chains. It should be further appreciated that any numeric reference to any client device, subscription, WAN connection, and/or LAN connection is intended to indicate a required ordering, priority, or other characteristics of such elements.

Various embodiments may be useful in softAP computing devices that include multiple subscriptions/SIMs associated with different RATs, such as dual-subscription, dual standby (DSDS) softAP computing devices having a first subscription associated with an LTE network and a second subscription associated with a GSM network. It should be appreciated that various embodiment techniques may be used by softAP computing devices that include any number of subscriptions/SIMs. For example, multi-subscription, multi-standby (MSMS) mobile devices (e.g., a tri-SIM device, etc.) that share a common RF chain between at least two subscriptions/SIMs may be configured to perform various embodiment methods as described herein to route data traffic from various client devices to a plurality of WAN connections. Therefore, any reference to a softAP computing device herein is not intended to limit the scope of the claims to any particular number of subscriptions.

SoftAP computing devices configured to operate according to various embodiment techniques described herein may utilize various wireless communication networks having such standards and/or protocols as Code Division Multiple Access (CDMA), Time Division Multiple Access (TDMA), Frequency Division Multiple Access (FDMA), Orthogonal Frequency-Division Multiple Access (OFDMA), etc. A CDMA network may implement a radio technology such as Universal Terrestrial Radio Access (UTRA), CDMA2000, etc. UTRA includes Wideband-CDMA (W-CDMA) and other variants of CDMA. Further, cdma2000 may cover IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2).

Various embodiments may be implemented within a variety of communication systems 100 that include a plurality of mobile telephony networks (or cellular carrier networks), an example of which is illustrated in FIG. 1. A first wide area network (WAN) 102 (e.g., a mobile network) and a second WAN 104 may typically each include a plurality of cellular base stations (e.g., a first base station 130 and a second base station 140). The first base station 130 may be in communication with the first WAN 102 over a connection 134, and the second base station 140 may be in communication with the second WAN 104 over a connection 144. The first WAN 102 may be in communication with the Internet 164 over a connection 103, and the second WAN 104 may be in communication with the Internet 164 over a connection 105. A server 180 also may be in communication with the Internet over a connection 181.

Such base stations 130, 140 and their respective WANs 102, 104 may be affiliated with different telecommunication standards and/or protocols, such as Global System for Mobile Communications (GSM), 4$^{th}$ Generation (4G), 3G, Universal Mobile Telecommunications System (UMTS), etc. For example, the first base station 130 and first WAN 102 may be associated with an LTE network, the second base station 140 and WAN 104 may be associated with a GSM network. In some embodiments, any combination of the base stations 130, 140 and WANs 102, 104 may utilize the same telecommunication standards (e.g., LTE, WCDMA, GSM, etc.).

The communication system 100 may also include a softAP computing device 110 (e.g., a DSDA mobile device configured to operate as a mobile router, etc.). The softAP computing device 110 may be any mobile computing device capable of executing applications, routines, logic, circuitry, units, modules, and/or other components for enabling software-enabled access point (or mobile router) functionalities. For example, the softAP computing device 110 may include Wi-Fi transceivers, cellular network chip(s)/modem(s), client device identity modules (SIMs or SIM cards), antenna, processor(s), memory(s), and other components that may enable the softAP computing device 110 to establish a local area network (LAN) 161 (e.g., a Wi-Fi LAN) as well as communicate with various devices or wide area networks. In particular, the softAP computing device 110 may include components for communicating with the first WAN 102 through a first WAN connection 132 (e.g., a cellular network connection) to the first base station 130. The softAP computing device 110 may also be in communication with the second WAN 104 through a second WAN connection 142 to the second base station 140. The WAN connections 132 and 142 may be made through two-way wireless communication links of various communication technologies, standards, and/or protocols, such as 4G, 3G, code division multiple access (CDMA), time division multiple access (TDMA), WCDMA, GSM, and other mobile telephony communication technologies.

In some embodiments, the softAP computing device 110 may be configured to connect to another access point via wireless communications. For example, the softAP computing device 110 may connect via a wireless connection to a hardware router (or hardware Wi-Fi access point) associated with a local area network having a connection to the Internet 164. In other words, the softAP computing device 110 may utilize a Wi-Fi backhaul via a hardware router and/or other backhauls that may utilize the various base stations 130, 140.

Executing software for enabling a connectable software access point (or software-enabled access point router), the softAP computing device 110 may be capable of providing a local area network (LAN) 161 that may provide a plurality of client devices access to the various resources and/or devices via the WANs 102, 104. In particular, the softAP computing device 110 may serve as a LAN router (or hub) that provides a WAN connection for various client devices having wireless connection capabilities (e.g., Wi-Fi, etc.), such as a smartphone 174 (or tablet device), and a laptop computer 170. Client devices may also include game consoles, television devices (e.g., smart TVs), desktop computers (or personal computers), and local router devices.

Each of the client devices 174, 170 may be configured to connect to the softAP computing device 110 via wired or wireless LAN connections 171, 175. For example, the laptop computer 170 may connect to the softAP computing device 110 via a first LAN connection 171 (e.g., a Wi-Fi connection) and the smartphone 174 may connect to the softAP computing device 110 via a second LAN connection 175 (e.g., a universal serial bus (USB) connection or Wi-Fi connection). In various embodiments, the LAN connections 171, 175 may be wired (e.g., USB connections, etc.) or wireless (e.g., Wi-Fi connections, etc.). In some embodiments, the LAN connections 171, 175 may utilize various short-range or long-range wireless communication technologies, protocols, and/or standards, such as Bluetooth, Zigbee, Wi-Fi Direct, RF, etc.

Figure 2:
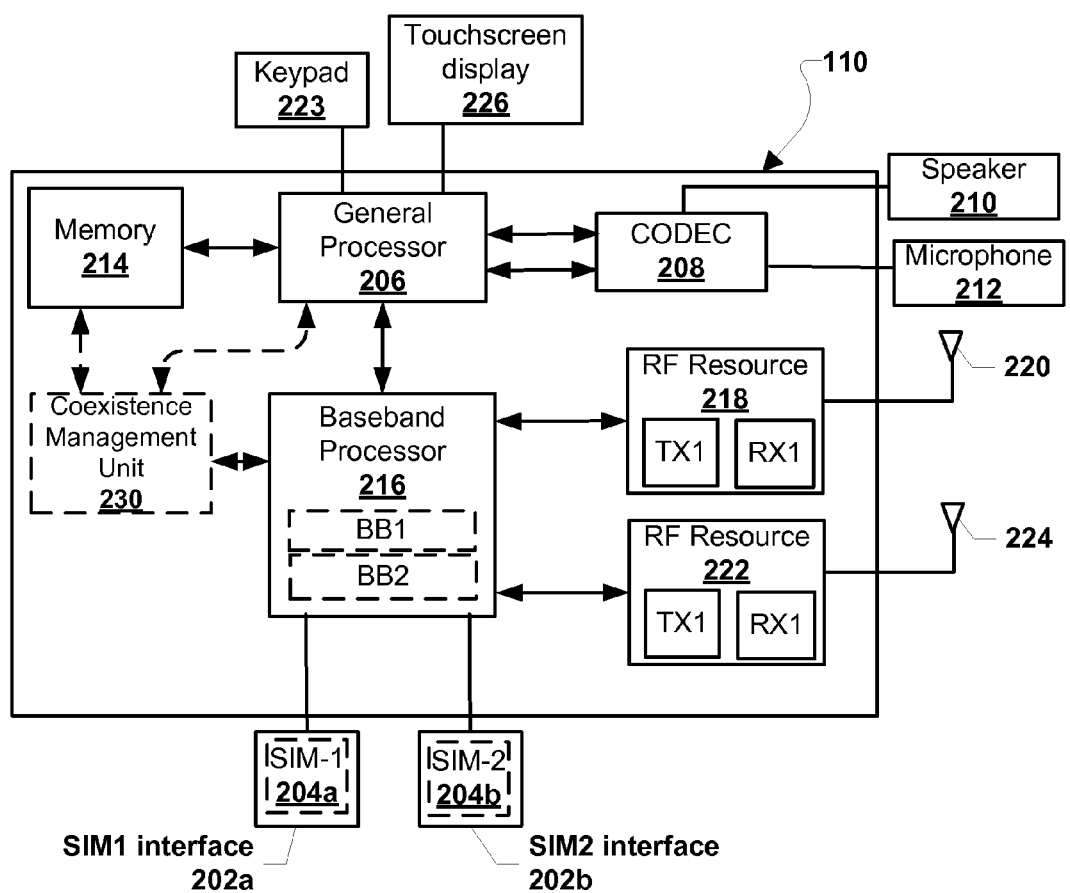
FIG. 2 is a component block diagram of a computing device suitable for use with various embodiments.

FIG. 2 illustrates components of the softAP computing device 110 (e.g., a multi-SIM, multi-active mobile device) suitable for implementing various embodiments. According to various embodiments, the computing device 110 may be similar to the computing device 110 as described with reference to FIG. 1. With reference to FIGS. 1-2, the computing device 110 may include a first SIM interface 202a that may receive a first subscriber identity module 204a (referred to as "SIM-1" in FIG. 2) associated with a first subscription. The computing device 110 may also include a second SIM interface 202b that may receive a second subscriber identity module 204b (referred to as "SIM-2" in FIG. 2) associated with a second subscription.

A SIM in various embodiments may be a Universal Integrated Circuit Card (UICC) that is configured with SIM and/or universal SIM (USIM) applications, enabling access to, for example, GSM and/or UMTS networks. The UICC may also provide storage for a phone book and other applications. Alternatively, in a CDMA network, a SIM may be a UICC removable user identity module (R-UIM) or a CDMA client device identity module (CSIM) on a card. Each SIM card may have a processing unit (CPU), read-only memory (ROM), random-access memory (RAM), electrically-erasable programmable read-only memory (EEPROM), and input/output (I/O) circuits.

A SIM used in various embodiments may contain user account information, an international mobile client device identity (IMSI), a set of SIM application toolkit (SAT) commands, and storage space for phone book contacts. A SIM card may further store home identifiers (e.g., a System Identification Number (SID)/Network Identification Number (NID) pair, a home public land mobile network (HPLMN) code, etc.) to indicate the SIM card network operator provider. An Integrated Circuit Card Identity (IC-CID) SIM serial number may be printed on the SIM card for identification. However, a SIM may be implemented within a portion of memory of the computing device 110 (e.g., memory 214), and thus need not be a separate or removable circuit, chip or card.

The computing device 110 may include at least one controller, such as a general processor 206 (or application processor), that may be coupled to a coder/decoder (CODEC) 208. The CODEC 208 may in turn be coupled to a speaker 210 and a microphone 212. The general processor 206 may also be coupled to the memory 214. The memory 214 may be a non-transitory computer-readable storage medium (or non-transitory processor-readable storage medium) that stores processor-executable instructions. For example, the instructions may include routing communication data relating to the first or second subscription though a corresponding baseband-RF resource chain. The memory 214 may store an operating system (OS), as well as user application software and executable instructions. The memory 214 may also store application data, such as an array data structure.

The general processor 206 and the memory 214 may each be coupled to at least one baseband modem processor 216. The SIMs in the computing device 110 (e.g., the SIM-1 204a and the SIM-2 204b) may be associated with baseband-RF resource chains. The computing device 110 may include a plurality of baseband-RF resource chains that may share the baseband modem processor 216 (i.e., a single device that performs baseband/modem functions for all SIMs on the computing device 110). In some embodiments, when the computing device 110 includes a plurality of baseband-RF resource chains, each RF resource chain may include physically or logically separate baseband processors (e.g., BB1, BB2).

A baseband-RF resource chain may include the baseband modem processor 216 that may perform baseband/modem functions for communicating with/controlling a RAT and may include one or more amplifiers and radios, referred to generally herein as the first RF resource 218. The computing device 110 may include a second RF resource 222 coupled to the baseband modem processor 216 and another wireless antenna 224, such as a transceiver coupled to an antenna. The second RF resource 222 and associated wireless antenna 224 may be distinct from the baseband-resource chain described. For example, the second RF resource 222 may be coupled to the baseband modem processor 216 or alternatively to a separate modem (not shown). With the second RF resource 222, the computing device 110 may be configured to simultaneously conduct communications using the first RF resource 218 and the second RF resource 222 (e.g., maintain an active GSM connection while also conducting an LTE call).

In some embodiments, the RF resources 218, 222 may be associated with different RATs. For example, a first RAT (e.g., a GSM RAT) and a second RAT (e.g., a CDMA or WCDMA RAT) may be associated with the first RF resource 218 or the second RF resource 222, or vice versa. The RF resources 218, 222 may each include transceivers that may perform transmit/receive functions on behalf of various RATs. The RF resources 218, 222 may also include separate transmit and receive circuitry, or may include a transceiver that combines transmitter and receiver functions.

In some embodiments, the general processor 206, the memory 214, the baseband processor(s) 216, and the RF resources 218, 222 may be included in the computing device 110 as a system-on-chip. In some embodiments, the first and second SIMs 204a, 204b and their corresponding interfaces 202a, 202b may be external to the system-on-chip. Further, various input and output devices may be coupled to components on the system-on-chip, such as interfaces or controllers. Example user input components suitable for use in the computing device 110 may include, but are not limited to, a keypad 223, a touch screen display 226, and the microphone 212.

In some embodiments, the keypad 223, the touch screen display 226, the microphone 212, or a combination thereof, may perform the function of receiving a request to initiate an outgoing call. For example, the touch screen display 226 may receive a selection of a contact from a contact list or receive a telephone number. In another example, either or both of the touch screen display 226 and the microphone 212 may perform the function of receiving a request to initiate an outgoing call. For example, the touch screen display 226 may receive a selection of a contact from a contact list or to receive a telephone number. As another example, the request to initiate the outgoing call may be in the form of a voice command received via the microphone 212. Interfaces may be provided between various software modules and functions in the computing device 110 to enable communication between them, as is known in the art.

Functioning together, the two SIMs 204a, 204b, the baseband modem processor 216, the RF resources 218, 222, and the wireless antennas 220, 224 may constitute two or more RATs. For example, a SIM, baseband processor and RF resource may be configured to support two different RATs, such as GSM and WCDMA. More RATs may be supported on the computing device 110 by adding more SIM cards, SIM interfaces, RF resources, and/or antennae for connecting to additional mobile networks.

In some embodiments, the computing device 110 may include a coexistence management unit 230 configured to manage and/or schedule the RATs' utilization of the RF resources 218, 222. In some embodiments, the coexistence management unit 230 may be implemented within the general processor 206. In some embodiments, the coexistence management unit 230 may be implemented as a separate hardware component (i.e., separate from the general processor 206). In some embodiments, the coexistence management unit 230 may be implemented as a software application stored within the memory 214 and executed by the general processor 206.

Figure 3:
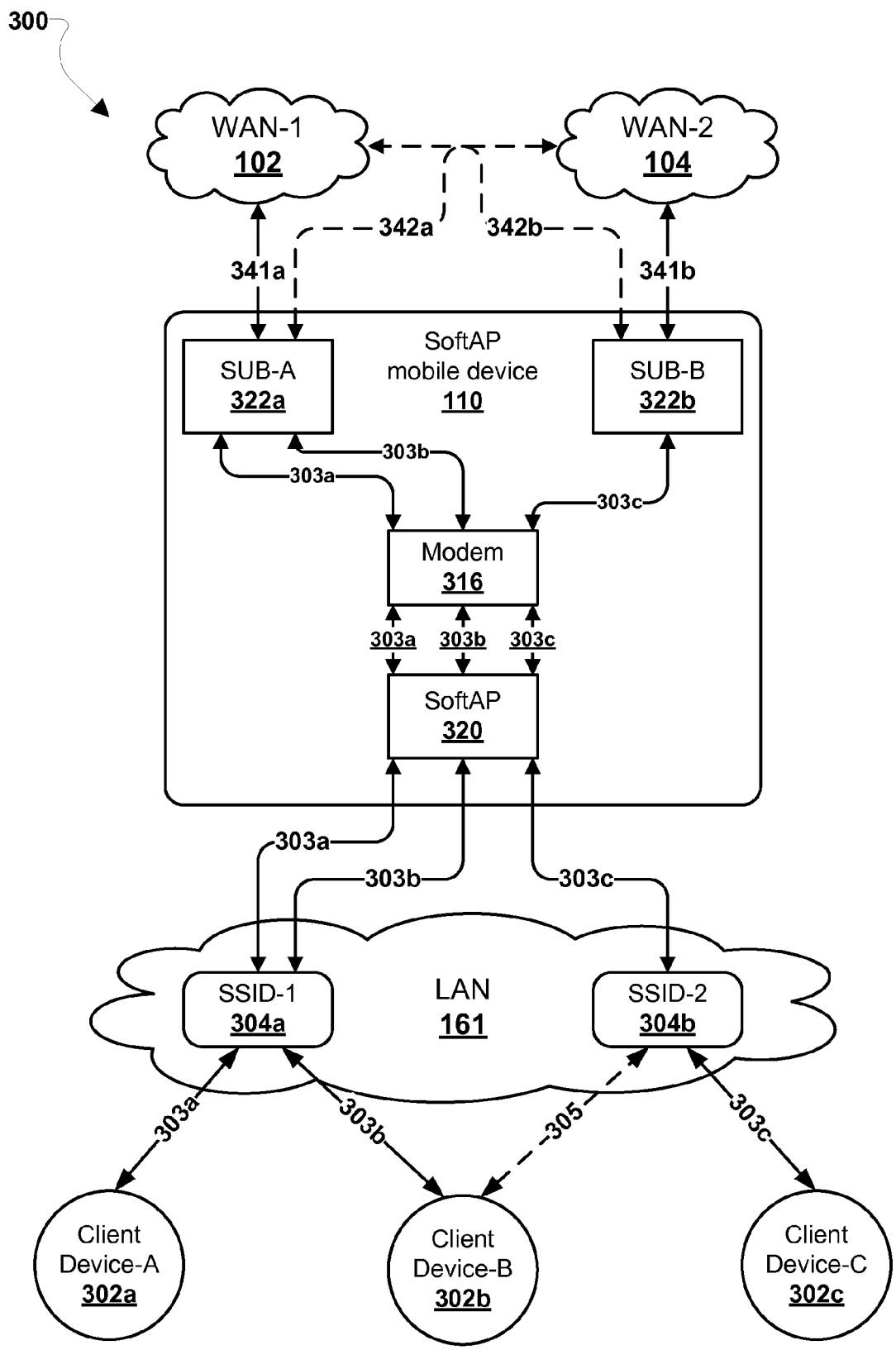
FIG. 3 is a diagram of various data traffic flows routed by a software-enabled access point computing device (or softAP computing device) capable of providing concurrent wide area network (WAN) access via WAN subscriptions to various client devices connected to the softAP computing device via a local area network (LAN) according to various embodiments.

FIG. 3 illustrates a diagram 300 of various data traffic flows routed by a software-enabled access point computing device (or softAP computing device 110) capable of providing WAN access via WAN subscriptions to various client devices 302a, 302b, 302c connected to the softAP computing device 110 via a local area network 161. According to various embodiments, the softAP computing device 110 may be similar to the computing device 110 as described with reference to FIGS. 1, 2. With reference to FIGS. 1-3, the softAP computing device 110 may include various processing units as described, and may be configured to execute various software applications, instructions, services, routines, logic, and operations for mapping LAN connections to WAN connections associated with subscriptions supported by the softAP computing device 110. In particular, the softAP computing device 110 may execute, via an application processor, a softAP module 320 configured to administer the various mobile router functionalities for routing data traffic related to a first subscription and its corresponding resources (e.g., radio chain, etc.), referred to as SUB-A 322a, and/or related to a second subscription and its corresponding resources (e.g., radio chain, etc.), referred to as SUB-B 322b. SUB-A 322a may be connected to the first WAN 102 (referred to as "WAN-1") via a first WAN connection 341a, and SUB-B 322b may be connected to the second WAN 104 (referred to as "WAN-2") via a second WAN connection 341b. For example, SUB-A 322a may be associated with and connected to an LTE cellular network and SUB-B 322b may be associated with and connected to a GSM cellular network, each network providing access to the Internet. In some embodiments, SUB-A 322a may be connected to the second WAN 104 via a connection 342a and/or SUB-B 322b may be connected to the first WAN 102 via a connection 342b. In other words, the softAP computing device 110 may be configured to utilize two concurrent, active WAN connections to the same or different WANs.

The softAP module 320 may be configured to exchange data with other components of the softAP computing device 110, such as a modem 316 (e.g., baseband modem processor 216 in FIG. 2), the operating system of the softAP computing device 110, as well as various networking interfaces, such as a wireless local area network (WLAN) module configured to process transmissions to and from other devices via a short-range communication protocol (e.g., Wi-Fi, Bluetooth, etc.) and wireless wide area network (WWAN) modules configured to process transmissions between the softAP computing device 110 and various external networks and devices (e.g., cellular or mobile networks, etc.). For example, data traffic may be routed by the softAP module 320 from SUB-A 322a or SUB-B 322b to the modem 316 and to devices utilizing the LAN 161, and vice versa. The softAP computing device 110 via the softAP module 320 may generate and maintain the LAN 161 with various LAN connections, such as a first SSID 304a (referred to as "SSID-1") and a second SSID 304b (referred to as "SSID-2").

Further, the softAP module 320 may be configured to utilize stored data indicating mappings or associations between various LAN connections and WAN connections supported by the softAP computing device 110. For example, the softAP module 320 may be configured to access stored data tables that include records relating particular service set identifiers (SSIDs) and/or client device identifiers (e.g., media access control (MAC) addresses, etc.) to particular cellular network subscriptions, radio chains, and/or IP addresses. In particular, the softAP module 320 may store mappings that indicate that the first SSID 304a for the LAN 161 is mapped to (or associated with) the first subscription and its related resources (or SUB-A 322a), and that the second SSID 304b for the LAN 161 is mapped to (or associated with) the second subscription and its related resources (or SUB-B 322b).

Various client devices 302a-302c may connect to the LAN 161 via various LAN connections. For example, the first client device 302a (referred to as "Client Device-A") and the second client device 302b (referred to as "Client Device-B") may be connected to the first SSID 304a, and the third client device 302c (referred to as "Client Device-C") may be connected to the second SSID 304b. In some embodiments, based on user selection inputs, client devices may be connected to different LAN connections. For example, the second client device 302b may be connected to the second SSID 304b, such as via a Wi-Fi signaling 305. In various embodiments, the client devices 302a-30c may connect to the LAN 161 via wired connections (e.g., universal serial bus (USB), etc.) or wireless connections (e.g., Wi-Fi, etc.).

Via the LAN connections, the client devices 302a-302c may be enabled to transmit and/or receive data traffic with the wide area networks associated with the subscriptions of the softAP computing device 110. In particular, the first client device 302a may exchange a first data traffic 303a routed to and from SUB-A 322a, the second client device 302b may exchange a second data traffic 303b routed to and from SUB-A 322a, and the third client device 302c may exchange a third data traffic 303c routed to and from SUB-B 322b. Such data traffic 303a, 303b, 303c may be routed via the softAP module 320 using the mappings described.

Figure 4A:
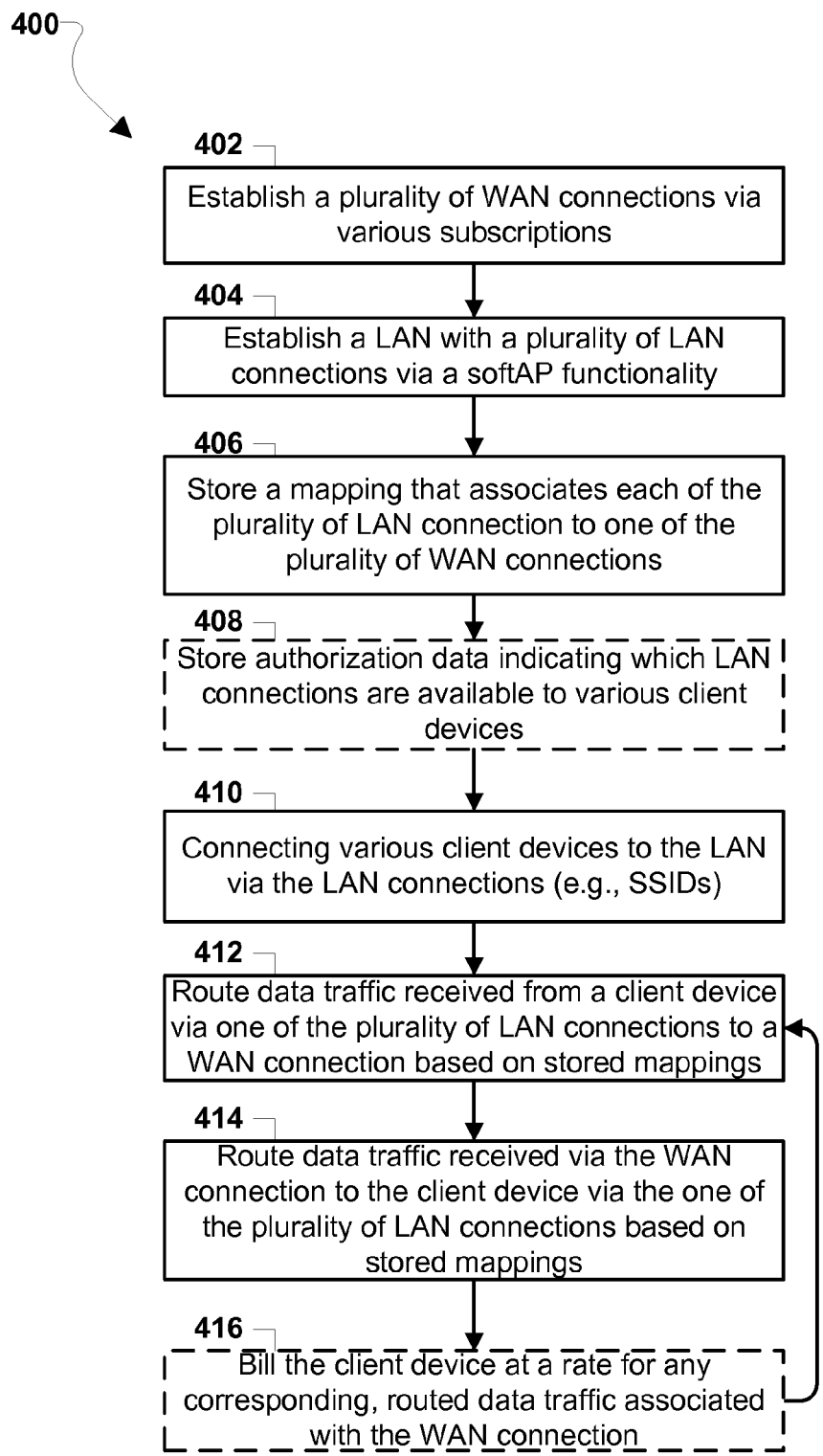
FIG. 4A is a process flow diagram illustrating a method for a softAP computing device to route data to/from a plurality of subscriptions based on mappings of LAN connections of various client devices according to various embodiments.

FIG. 4A illustrates a method 400 for a softAP computing device to route data to/from a plurality of subscriptions based on mappings of WAN connections to LAN connections used by various client devices according to various embodiments. The method 400 may be performed by a softAP computing device processor (e.g., the general processor 206 or baseband modem processor 216 as described with reference to FIG. 2) executing a softAP module 320 (FIG. 3).

With reference to FIGS. 1-4A, in block 402, the processor of the softAP computing device may establish a plurality of WAN connections via a plurality of subscriptions. For example, the softAP computing device may establish an LTE cellular network connection on a first radio chain associated with an LTE subscription (and SIM) and a GSM cellular network connection on a second radio chain associated with a GSM subscription (and SIM). Such establishment operations may include conventional signaling with base stations and other components of wide area networks in order to initiate active connections capable of supporting data transfers. Further, each of the WAN connections may be linked to a different Public IP address. Such addresses may be appended to or otherwise included within data traffic (or packets) transmitted via the WAN connections. In other words, the Public IP address of a WAN connection may be inserted in data packets to indicate the source of the traffic. In various embodiments, the first and second WAN connections may be to different networks of different communication standards (e.g., GSM, LTE, WCDMA, etc.) and/or carriers (e.g., Verizon, etc.), or alternatively may be to the same network.

In block 404, the processor of the softAP computing device may establish a local area network (LAN) with a plurality of LAN connections via a softAP (or wireless hotspot or mobile router) functionality. For example, via a softAP module as described, the softAP computing device may broadcast a first SSID and a second SSID that may be used by various client devices to connect to the softAP computing device's LAN. In various embodiments, the LAN may be a wireless LAN (WLAN), such as a Wi-Fi LAN, and/or may utilize wired connections (e.g., USB connections to the softAP computing device). In various embodiments, each LAN connection (e.g., SSID) may be associated with a wireless LAN (WLAN) interface, such as a code or indicator (e.g., wlan0, wlan1, etc.). Further, the softAP computing device may associate each connected client device with a Private IP address and store data representing such associations.

In order to create associations between the WAN and LAN connections, the softAP computing device may be configured to store a mapping that associates each in a plurality of LAN connections for the LAN established by the softAP computing device with one of a plurality of WAN connections. Accordingly, in block 406, the processor of the softAP computing device may store a mapping that associates each of the plurality of LAN connections (and/or the client devices connected to those LAN connections) with one of the plurality of WAN connections. In particular, the softAP computing device may store relationships between the SSIDs of the LAN connections to the WAN connections. For example, the softAP computing device, such as via the softAP module, may store in a data table a first entry that links or otherwise associates a first WLAN SSID to a first WAN connection to an LTE network and a second entry that links a second WLAN SSID to a second WAN connection to a GSM network.

In some embodiments, the mappings may be accomplished via network address translation (NAT) functionalities. For example, each SSID supported by the softAP computing device may be associated with a WAN connection (or WAN subscription) in an entry of a data table stored at a NAT layer or otherwise with an operation, routine, or module related to NAT functionalities. In other words, NAT functionalities may be used so that data traffic leaving the softAP computing device via the WAN connection includes indicators (e.g., Public IP addresses) of that WAN connection, regardless of the LAN connection from which the data traffic original arrived from a client device. Such NAT entries may also be used by the softAP computing device to determine the LAN connection downlink to which traffic should be routed in order to send incoming data to client devices. In various embodiments, NAT entries may be generated via the kernel of the softAP computing device.

In some embodiments, the stored mappings may include data indicating the current WAN connection (or associated subscription) each LAN connection is being routed to in addition to the assigned WAN connection (or associated subscription) for the LAN connection. For example, when the softAP computing device re-routes data traffic from an SSID, normally mapped to use a first WAN connection, to a second WAN connection due to the first WAN connection being out-of-service, the softAP computing device may set data within a data table entry for the SSID that indicates the second WAN connection is only a temporary, current WAN connection. In this way, the softAP computing device may keep a record of the assigned, default WAN connection versus the current WAN connection for LAN connections so that dynamic, temporary switching may be supported. In some embodiments, the mappings may include common IP address data that may be used to indicate the IP address of the current subscription associated with a particular LAN connection. Such common IP addresses may be adjusted dynamically to indicate the subscription that is associated with any LAN connection at a given time.

In various embodiments, the mappings may be provided by an administrator of the softAP computing device. For example, a user may manually link SSIDs to WAN connections (or subscriptions) of the softAP computing device via a user interface or other input means, such as by uploading/referencing a spreadsheet or other data file containing mappings between the LAN and WAN connections available to the softAP computing device.

In optional block 408, the processor of the softAP computing device may store authorization data indicating the LAN connections that are available to various client devices. For example, the softAP computing device may store profiles with permissions or access data for various client devices and/or their users that indicates whether the client devices have certain credentials for accessing the various WAN connections supported by the softAP computing device. Such authorizations data may be beneficial in maintaining exclusivity to higher value (e.g., higher bandwidth, increased data rate, etc.) WAN connections. In some embodiments, the stored authorization data may also include information regarding the billing and/or payment status of client devices. For example, the authorizations data may include information indicating whether a user of a certain client device has paid ahead for faster WAN connection access or alternatively is delinquent in paying for service, thus making it currently ineligible for accessing the faster WAN connection.

In block 410, the processor of the softAP computing device may connect various client devices to the LAN via the LAN connections (e.g., SSIDs). In other words, the softAP computing device may permit the client devices to access the LAN (and thus the WAN connections) via the plurality of established LAN connections. For example, the softAP computing device may receive requests for access to the LAN from client devices and respond with acknowledgement messages and/or other data that may enable the client devices to access the LAN via the LAN connections. In some embodiments, the softAP computing device may allow client devices to connect to the LAN connections based on the stored authorization data. For example, in response to receiving connection requests from a particular client device for a first SSID associated with an LTE WAN connection in stored mappings, the softAP computing device, via the softAP module, may perform a look-up in the stored authorization data to determine whether the client device has permission to access the first SSID. In various embodiments, the softAP computing device may allow or disallow access based on various conditions, such as current number of connected LAN client devices, the available bandwidth on the various subscriptions, the power consumption and/or power availability of the softAP computing device, etc.

In block 412, the processor of the softAP computing device may route data traffic received from a client device via one of the plurality of LAN connections to a WAN connection based on stored mappings. For example, the softAP computing device may receive data packets from a first client device via a first SSID, perform a look-up in the mapping information to determine that the first SSID is linked to a first subscription, and then route the data packets to be transmitted to a remote source via a WAN connection of the first subscription. In various embodiments, the softAP computing device, via the softAP module, may append data to the data received from the client device that may indicate the subscription used for the WAN connection, such as identifying IP address information. Such information may be utilized by receiving devices for return transmissions.

In block 414, the processor of the softAP computing device may route data traffic received via the WAN connection to the client device via the one of the plurality of LAN connections based on stored mappings. For example, via the WAN connection, the softAP computing device may receive a set of data packets from a remote source over the Internet, perform a look-up in the mapping information to determine that a particular SSID is linked to the WAN connection (or its subscription), and then route the data packets to a particular client device via the SSID. In various embodiments, the softAP computing device, via the softAP module, may parse data packets to identify the destination address or recipient of data received from the WAN.

In various embodiments, the routing of blocks 412-414 may be accomplished by the softAP computing device via a softAP module configured to utilize a policy or rule set. For example, the softAP computing device may use a policy to route packets received from different SSIDs (e.g., SSID associated with LAN interfaces, such as 'wlan0') to their corresponding WAN connection, and vice versa. This policy may be defined within a NAT layer or other stored information linking LAN connections to WAN connections of the various subscriptions of the softAP computing device.

In optional block 416, the processor of the softAP computing device may bill the client device at a rate for any corresponding, routed data traffic associated with the WAN connection. For example, based on the speed of the used WAN connection, predefined characteristics of the associated subscription of the WAN connection, and/or the amount of data transferred via the used WAN connection, the softAP computing device may calculate a fee to be charged to the user of the client device. In some embodiments, the billing information may be calculated over a period of time and may further be communicated to the client device (or another device associated with the client device in a stored profile), such as via an email, short message service (SMS)/multimedia message service (MMS) text message, and/or a proprietary billing statement. In some embodiments, the softAP computing device may be configured to transmit a transaction request to a computing device (e.g., server) of a third-party financial entity or service associated with the client device.

Figure 4B:
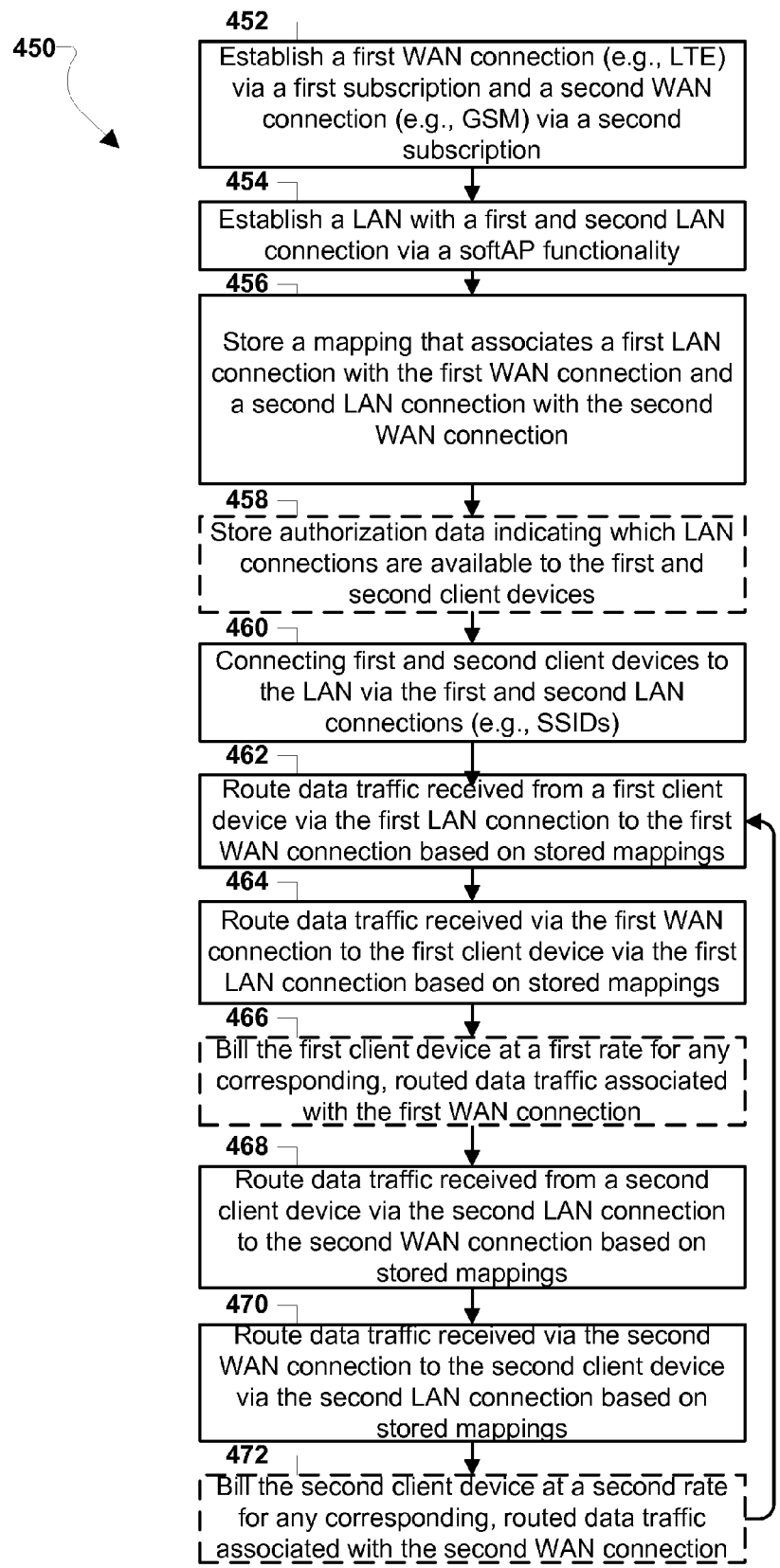
FIG. 4B is a process flow diagram illustrating a method for a softAP computing device to route data to/from a plurality of subscriptions based on mappings of LAN connections of a first and a second client device according to various embodiments.

FIG. 4B illustrates a method 450 for a softAP computing device to route data to/from a plurality of subscriptions based on mappings of LAN connections of various LAN client devices according to various embodiments. The method 450 may be performed by a softAP computing device processor (e.g., the general processor 206 or baseband modem processor 216 as described with reference to FIG. 2) executing a softAP module 320 (FIG. 3). The method 450 is similar to the method 400 as described with reference to FIG. 4A, except the method 450 includes specific references to a first and second client device, LAN connection, and WAN connection for the purpose of illustration of the operations of the method 400.

With reference to FIGS. 1-4B, in block 452, the processor of the softAP computing device may establish a first WAN connection via a first subscription and a second WAN connection via a second subscription. In block 454, the processor of the softAP computing device may establish a local area network (LAN) with a first LAN connection and second LAN connection via a softAP (or wireless hotspot or mobile router) functionality. In block 456, the processor of the softAP computing device may store a mapping that associates a first LAN connection with the first WAN connection and a second LAN connection with the second WAN connection, such as via an NAT functionality.

In optional block 458, the processor of the softAP computing device may store authorization data indicating the LAN connections that are available to the first and second client devices.

In block 460, the processor of the softAP computing device may connect the first client device to the LAN via the first LAN connection and the second client device to the LAN via the second LAN connection. In block 462, the processor of the softAP computing device may route data traffic received from the first client device via the first LAN connection to the first WAN connection based on the stored mappings. In block 464, the processor of the softAP computing device may route data traffic received via the first WAN connection to the first client device via the first LAN connection based on the stored mappings.

In optional block 466, the processor of the softAP computing device may bill the first client device at a first rate for any corresponding, routed data traffic associated with the first WAN connection.

In block 468, the processor of the softAP computing device may route data traffic received from the second client device via the second LAN connection to the second WAN connection based on the stored mappings. The operations in block 468 are similar to those of block 462 described, except that the softAP computing device may determine that data traffic from the second client device may be transmitted via the second WAN connection based on the mappings linking the second LAN connection (e.g., second SSID) to the second WAN connection.

In block 470, the processor of the softAP computing device may route data traffic received via the second WAN connection to the second client device via the second LAN connection based on the stored mappings. The operations in block 470 are similar to those of block 464 described, except that the softAP computing device may determine that data traffic received via the second WAN connection may be routed to the second client device via the second LAN connection based on the mappings linking the second LAN connection to the second WAN connection.

In optional block 472, the processor of the softAP computing device may bill the second client device at a second rate for any corresponding, routed data traffic associated with the second WAN connection. The operations in optional block 472 are similar to those of optional block 466 described, except that the softAP computing device may determine that any billing to the second client device may be based on its use of the second WAN connection. For example, when the second WAN connection is free-of-charge to all LAN client devices, no charge may be calculated.

Figure 5:
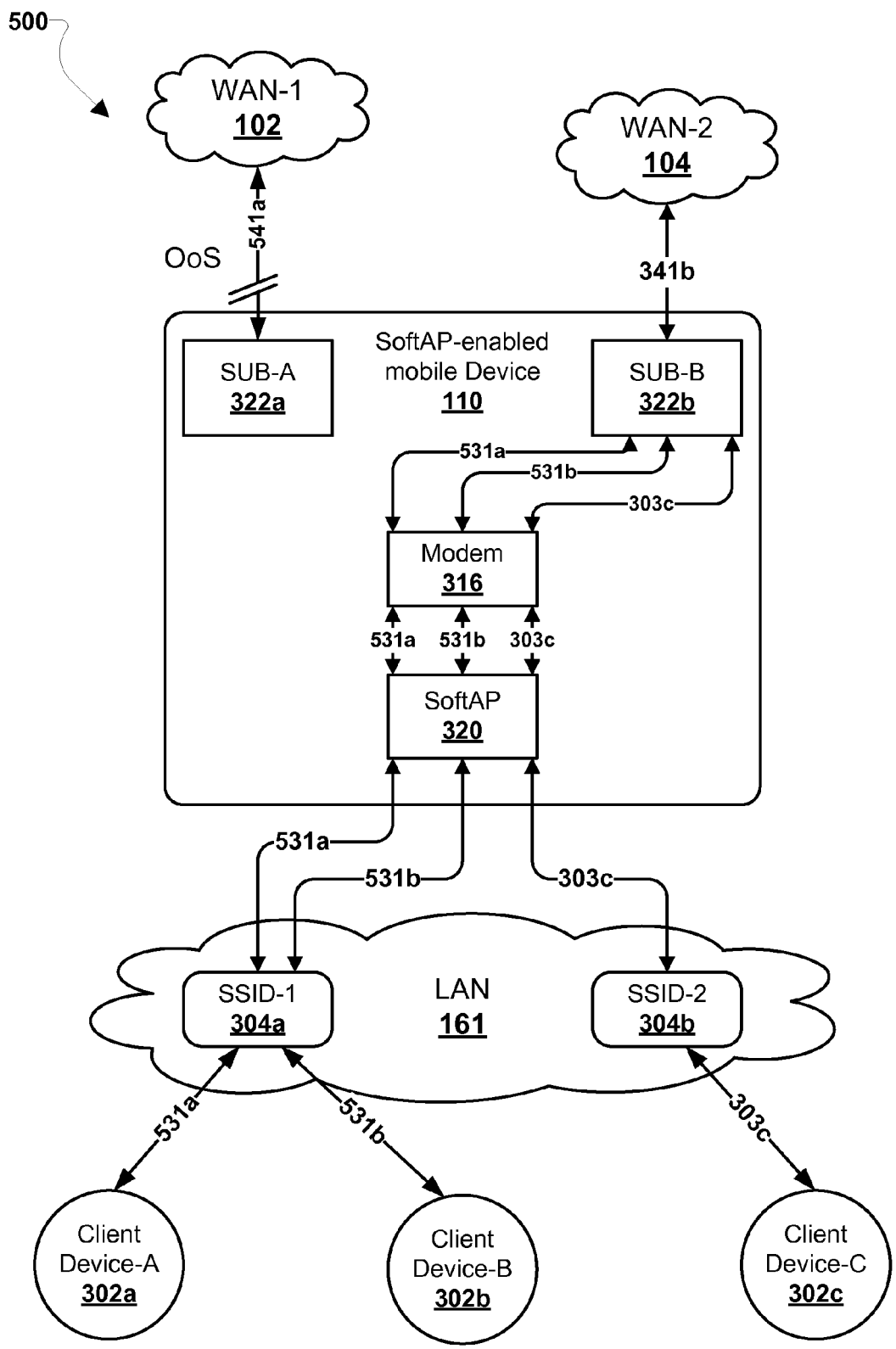
FIG. 5 is a diagram of various data traffic flows routed by a software-enabled access point computing device (or softAP computing device) capable of providing WAN access via an in-service WAN subscription when another WAN subscription is out-of-service to various client devices connected to the softAP computing device via a local area network according to various embodiments.

FIG. 5 illustrates a diagram 500 of various data traffic flows routed by a software-enabled access point computing device (or softAP computing device 110) capable of providing WAN access via WAN subscriptions to various client devices 302a, 302b, 302c connected to the softAP computing device 110 via the local area network 161. According to various embodiments, the softAP computing device 110 may be similar to the computing device 110 as described with reference to FIGS. 1-3. The diagram 500 is similar to the diagram 300 described, except that the diagram 500 illustrates how data traffic may be re-routed to one of the in-service subscriptions of the softAP computing device 110 in response to another subscription entering an out-of-service condition or state. In particular, due to various scenarios, such as the softAP computing device 110 entering into an area with poor coverage related to the first WAN 102, SUB-A 322a may encounter a broken or lost connection 541a to the first WAN 102. For example, the signal strength of the connection 541a may go below a minimal threshold or may be zero, causing the first subscription to generate signals that may be received at the softAP module 320 to indicate a lost or released connection to the first WAN 102.

In response to an indication of a lost or released connection to the first WAN 102, the softAP module 320 may re-route data traffic originally directed to SUB-A 322a to be handled by SUB-B 322b. For example, data traffic 531a, 531b related to the first client device 302a and the second client device 302b, respectively, may be re-routed through the modem 316 to SUB-B 322b in response to SUB-A 322a encountering an out-of-service condition. In other words, instead of communicating with the first WAN 102 via the first subscription (SUB-A 322a), the first client device 302a and second client device 302b may be enabled, via the softAP module 320, to exchange data with the second WAN 104 in order to avoid losing WAN connectivity while SUB-A 322a is out-of-service.

In various embodiments, the first client device 302a and second client device 302b may return to exchanging data with the first WAN 102 in response to the softAP module 320 determining that SUB-A 322a is again in-service, such as in response to receiving a kernel event indicating the signal strength associated with the connection to the first WAN 102 is over a predefined threshold value.

Figure 6A:
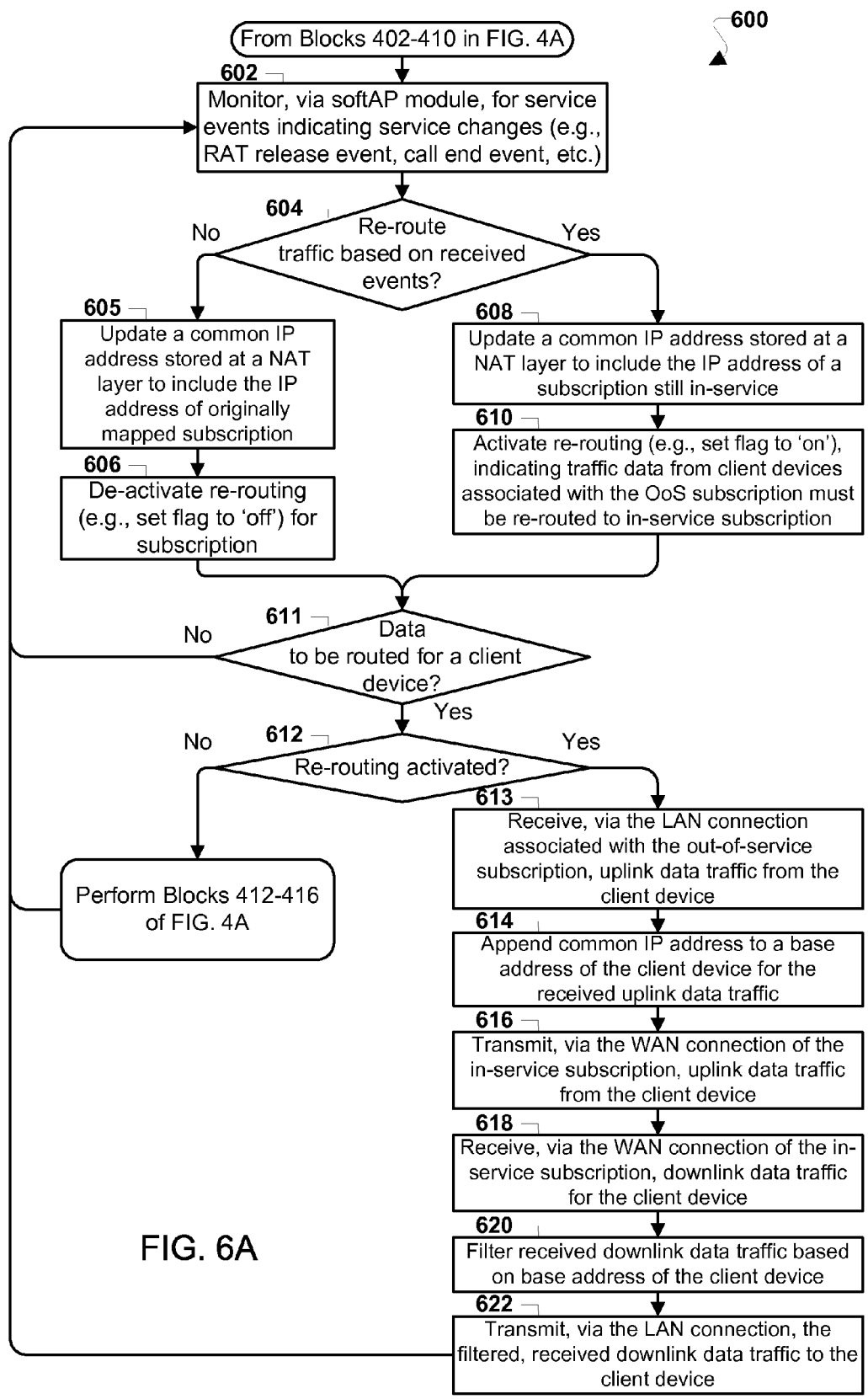
FIG. 6A is a process flow diagram illustrating a method for a softAP-enabled mobile configured to route data to/from a plurality of subscriptions based on LAN connections of various LAN client devices to route data associated with an out-of-service subscription to an in-service subscription according to various embodiments.
Figure 6B:
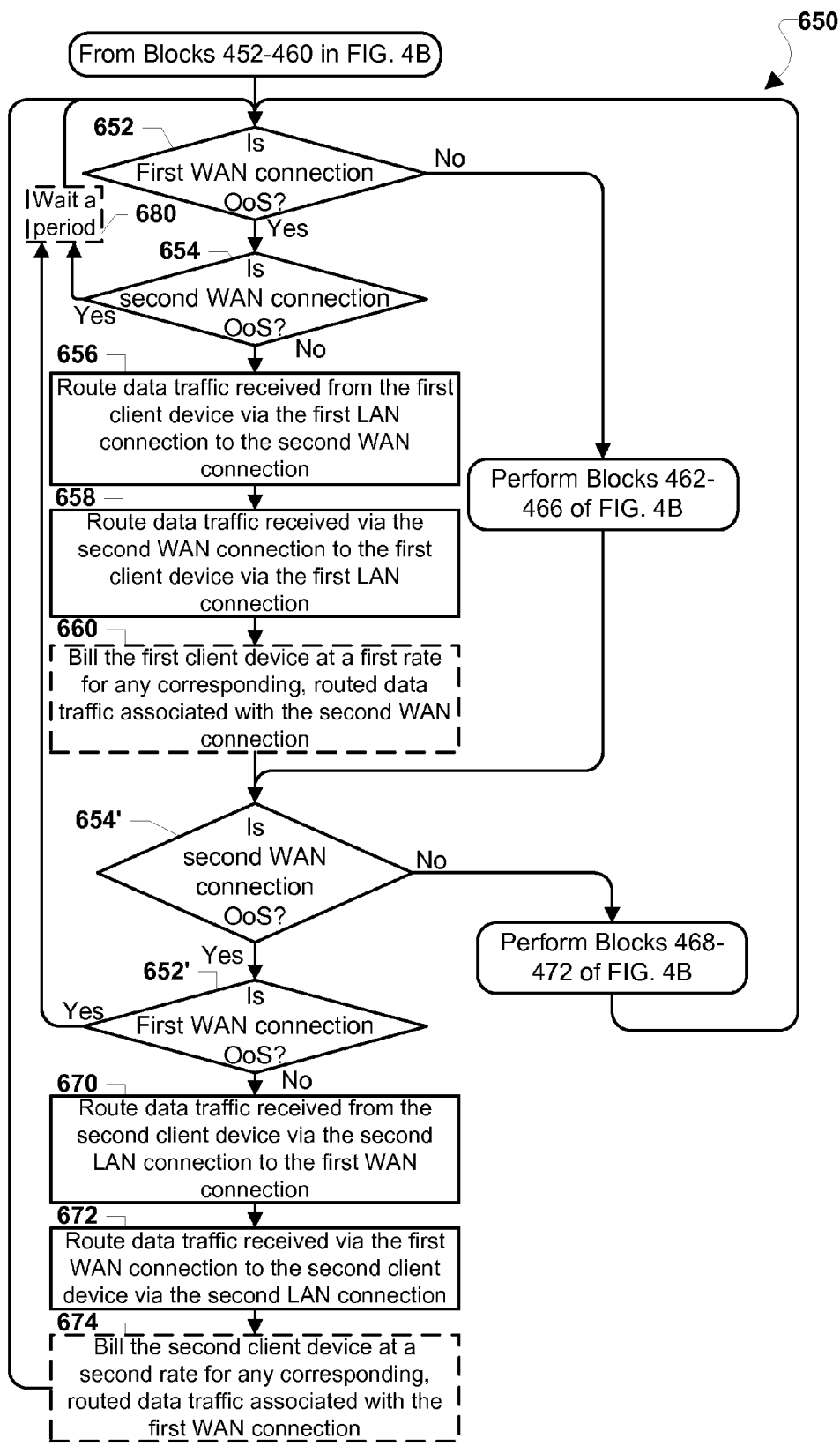
FIG. 6B is a process flow diagram illustrating a method for a softAP-enabled mobile to route data associated with an out-of-service subscription to an in-service subscription when configured to route data to/from a plurality of subscriptions based on LAN connections of a first and second client device according to various embodiments.

FIGS. 6A-6B illustrate methods 600, 650 that may be performed to improve the functioning of a softAP computing device routing data traffic associated with LAN client devices by enabling seamless experiences when a WAN connection of a subscription becomes unavailable (or out-of-service) according to various embodiments. In order to improve the connectivity and use of WAN connections of subscriptions, the softAP computing device may be configured to re-route data traffic in order to avoid out-of-service conditions on one or more subscriptions.

FIG. 6A illustrates a method 600 for a softAP-enabled mobile configured to route data to/from various WAN connections associated with LAN connections such that data traffic from various client devices are routed away from out-of-service subscriptions to in-service subscriptions according to various embodiments. The method 600 may be performed by a softAP computing device processor (e.g., the general processor 206 or baseband modem processor 216 as described with reference to FIG. 2) executing a softAP module 320 (FIG. 3). The method 600 may be similar to the method 400 (FIG. 4A) described, except that the method 600 may include operations for setting data (e.g., flags, modes, state variables, etc.) in response to receiving events or other indicators of the current service state of the various supported subscriptions of the softAP computing device. For example, the method 600 may cause event-driven switches between WAN connections of subscriptions of the softAP computing device that are used at a given time such that data traffic associated with an out-of-service subscription may continue to the exchanged between LAN client devices and wide area networks. Such routing (or re-routing) may be important when the softAP computing device moves to areas where signal strength is inadequate for supporting one of its plurality of subscriptions. For example, when the softAP computing device is moved to an area that only has GSM mobile network coverage, LAN client devices previously connected to an SSID associated with an LTE (or WCDMA) subscription may prefer to have limited service with the GSM instead of completely losing service until the softAP computing device returns to an area with LTE coverage. In this way, the softAP computing device may improve the service experienced by LAN client devices by avoiding outages when at least one subscription is in-service.

With reference to FIGS. 1-6A, after performing the operations of blocks 402-410 (e.g., as described with reference to FIG. 4A), the processor of the softAP computing device may monitor, via a softAP module, for events indicating service changes (e.g., a RAT release event, a call end event, etc.) in block 602. Such events may indicate whether various subscriptions have lost service (e.g., have become out-of-service after a period of being in-service) or have regained service (e.g., have become in-service after a period of being out-of-service). Further, the events may be system events, signals, interrupts, or other messages generated in response to receiving signals from other services, modules, circuits, or other functionalities of the softAP computing device, such as routines configured to periodically test WAN connectivity for various subscriptions of the softAP computing device. For example, the softAP computing device via the softAP module may listen for kernel or operating system events that indicate the current connection status or condition of an LTE WAN connection associated with a first subscription and/or a GSM WAN connection associated with a second subscription. In some embodiments, such events may include "call_end" events for a GSM subscription and/or RAT release messages for a WCDMA subscription. In some embodiments, the events may be notifications or signals from a modem that a subscription has gone out-of-service (or lost service) or gained (or re-gained) service.

Conventional multi-subscription devices may include a call manager module (or a multi-mode call manager) that acts as a central coordinator and organizes all calls associated with various subscriptions, such as by managing call origination and termination. For example, the call manager module may generate call identifiers (IDs) for incoming calls (e.g., mobile terminating or "MT" calls) or outgoing calls (e.g., mobile originating or "MO" calls) on a Universal Mobile Telecommunications System (UMTS)/GSM/Wideband Code Divisional Multiple Access (WCDMA) subscription and/or an LTE subscription. Therefore, the call manager module may be aware of the status of various packet-switching (PS) calling. For example, the call manager may be aware of when a data call has completed. Accordingly, in some embodiments, the softAP module may monitor for messages or event signals from a call manager module that indicate a loss or gain of service.

In determination block 604, the processor of the softAP computing device may determine whether to re-route data traffic based on received events. In other words, the softAP computing device may determine whether a subscription (or its related WAN connection) is in an out-of-service (or OoS) condition based on received events. For example, the softAP computing device may determine whether any events have been received that indicate a WAN connection associated with one of the subscriptions (e.g., GSM subscription, LTE subscription, etc.) of the softAP computing device has changed from in-service to out-of-service, or vice versa.

In response to determining that re-routing traffic should be done based on received events (i.e., determination block 604="Yes"), the processor of the softAP computing device may update a common IP address stored at a network address translation (NAT) layer to include the IP address of a subscription still in-service in block 608. In other words, the softAP computing device may generate the common (or public) IP address as a remapped address to use with re-routed traffic data so that the data may be transmitted via a still in-service subscription (and its WAN connection). For example, when a first subscription is in-service and a second subscription is out-of-service at a given time, the softAP computing device may update a common IP address to include the IP address associated with the first subscription. In this way, the softAP computing device (via the softAP module) may change data packets to include new addresses, enabling otherwise undeliverable data to be sent out through active, in-service subscriptions/connections.

In block 610, the processor of the softAP computing device may activate re-routing (e.g., set flag to 'on'), indicating traffic data from client devices associated with the out-of-service subscription must be re-routed to in-service subscription in order to utilize its WAN connection. This may be done by the softAP computing device by updating a bit, variable, flag, policy, or stored indicator with a value that indicates re-routing for data associated with a particular out-of-service subscription should be active. For example, the softAP computing device may modify a policy to indicate that data traffic from a certain SSID to an out-of-service WAN connection is to be routed to another, active WAN connection so privileged client devices will not experience disruption in service and QOS may be maintained. In various embodiments, the activation may include changing stored data associated with a particular subscription, WAN connection, client device, and/or LAN connection. For example, the softAP computing device may change the value of a stored variable associated with a certain SSID associated with a first subscription (e.g., a GSM subscription, etc.) to indicate that all data traffic from client devices connected to the LAN via the SSID should be re-routed to a second subscription (e.g., an LTE subscription, etc.) for transmission over its WAN connection.

In response to determining that re-routing traffic should not be done based on received events (i.e., determination block 604="No"), the processor of the softAP computing device may update the common IP address stored at the NAT layer to include the IP address of originally mapped subscription in block 605. For example, if a LAN connection (SSID) or client device originally mapped to a first subscription was previously re-routed to a second subscription in order to avoid an out-of-service condition on the first subscription, the softAP computing device may store data indicating the LAN connection or client device has been returned to utilizing the first subscription due to its current in-service condition. As another example, an original IP address used for routing data from a first LAN client device to a GSM subscription's WAN connection may be re-instituted to replace another IP address stored for temporarily re-routing data to an LTE subscription's WAN connection while the GSM subscription's WAN connection was out-of-service.

In block 606, the processor of the softAP computing device may de-activate the re-routing (e.g., set flag to 'off')

for the in-service subscription, such that stored data (e.g., policy, variable, bit, flag, etc.) indicates traffic data from client devices associated with the in-service subscription may be routed per usual via the in-service subscription. For example, in response to determining service has been re-established for an LTE subscription (e.g., an LTE WAN connection is back online), the softAP computing device may store a bit or flag to indicate that re-routing of the traffic data from the LTE subscription's WAN connection to a GSM subscription's WAN connection may be discontinued. As another example, the softAP computing device may modify a policy to indicate that data traffic from a certain SSID to a temporary WAN connection may be re-routed back to an original WAN connection in response to receiving a modem indication that the original WAN connection has regained service. The operations of block 606 may be optional when re-routing is already de-activated.

In response to performing the operations in block 606 or block 610, the processor of the softAP computing device may determine whether there is data to be routed for a client device in determination block 611. In other words, the softAP computing device may determine whether a client device has transmitted data via a LAN connection to the softAP computing device for delivery via a WAN connection or data from a WAN connection has been received for delivery to one of the client devices connected via a LAN connection. In response to determining that there is no data to be routed for the client device (i.e., determination block 611="No"), the softAP mobile device may continue with the monitoring operations in block 602.

In response to determining that there is data to be routed for the client device (i.e., determination block 611="Yes"), the processor of the softAP mobile device may determine whether re-routing is activated for the data associated with the client device in determination block 612, such as by evaluating a mode, variable, flag, or other stored indicator. In response to determining that the re-routing is not activated (i.e., determination block 612="No"), the softAP computing device may perform the blocks 412-416 for routing data as described. In other words, as subscriptions are in-service, routing may be performed based on original mappings of LAN connections (e.g., SSIDs) to WAN connections of the subscriptions. For example, data from a first client device connected to a LAN via a first SSID may be routed to a first subscription normally associated with the first SSID when the first subscription is in-service.

In response to determining that the re-routing is activated (i.e., determination block 612="Yes"), the processor of the softAP computing device may receive, via the LAN connection associated with the out-of-service subscription, uplink data traffic from the client device in block 613, such as data requests (e.g., website requests, download requests, etc.) or other messages (e.g., emails, video calls, etc.) to be sent to remote devices via a WAN connection.

In block 614, the processor of the softAP computing device may append the common IP address to a base address (e.g., a private IP address) of the client device for the received uplink data traffic. For example, the softAP computing device may append the IP address associated with an in-service subscription instead of the out-of-service subscription the client device was originally mapped to use based on its LAN connection, and may transmit, via the WAN connection of the in-service subscription, uplink data traffic from the client device in block 616.

In block 618, the processor of the softAP computing device may receive, via the WAN connection of the in-service subscription, downlink data traffic for the client device. In block 620, the processor of the softAP computing device may filter the received downlink data traffic based on the base address of the client device. For example, the destination of the received downlink data traffic may be evaluated in order to determine the client device the data traffic should be routed to, such as based on an IP address, MAC address, or other identifying information.

In block 622, the processor of the softAP computing device may transmit, via the LAN connection associated with the client device having the base address, the filtered, received downlink data traffic to the client device. For example, the softAP computing device may relay the filtered data traffic (e.g., a video conference/call data) received via a first subscription from a remote source to a LAN client device via a LAN connection, despite the LAN connection (and LAN client device) being associated with a second, out-of-service subscription. The softAP computing device may then continue with the monitoring operations in block 602.

FIG. 6B illustrates a method 650 for a softAP-enabled mobile to route data associated with an out-of-service subscription to an in-service subscription when configured to route data to/from a plurality of subscriptions based on LAN connections of a first and second client device according to various embodiments. The method 650 may be performed by a softAP computing device processor (e.g., the general processor 206 or baseband modem processor 216 as described with reference to FIG. 2) executing a softAP module 320 (FIG. 3). The method 650 may be similar to the methods 400 (FIG. 4A) and 600 (FIG. 6A) described, except that the method 650 may include operations for monitoring the service state of the subscriptions of the softAP computing device to determine loss of service (i.e., a subscription enters an "out-of-service" state) in order to trigger a migration of traffic data away from the out-of-service subscriptions to subscriptions still in service, particularly with reference to a first and second client device.

With reference to FIGS. 1-6B, after performing the operations of blocks 452-460 (e.g., as described with reference to FIG. 4B), the processor of the softAP computing device may determine whether the first WAN connection is out-of-service in determination block 652. The operations of determination block 652 may be performed in relation to the first client device connected to the softAP computing device via the first LAN connection. Such a determination may be based on status variables, connectivity indicators, signals received from WAN communications functionalities (e.g., WAN interface, modem, etc.), and/or other information received at the softAP computing device. For example, the softAP computing device may receive or encounter an event indicating a low or non-existent signal strength for a certain WAN connection (e.g., LTE network connection). In response to determining that the first WAN connection is not out-of-service (i.e., determination block 652="No"), the softAP computing device may perform the operations for routing data for the first client device in blocks 462-466 as described.

In response to determining that the first WAN connection is out-of-service (i.e., determination block 652="Yes"), the processor of the softAP computing device may determine whether the second WAN connection is out-of-service in determination block 654. The operations in determination block 604 may be similar to those of determination block 652, except that the softAP computing device may evaluate the conditions of the second subscription and/or second WAN connection, such as whether a GSM cellular network is available for data transfers for the first client device.

In response to determining that the second WAN connection is out-of-service (i.e., determination block 654="Yes"), the processor of the softAP computing device may wait a period in optional block 680 and continue with the operations in determination block 652 for evaluating the available services of the subscriptions. In other words, when there are no subscriptions with service, the softAP computing device may not exchange any data with a wide area network for either the first client device connected to the softAP computing device via first LAN connection or the second client device connected to the softAP computing device via the second LAN connection.

In response to determining that the second WAN connection is not out-of-service (i.e., determination block 654="No"), the processor of the softAP computing device may route data traffic received from the first client device via the first LAN connection to the second WAN connection in block 656, route data traffic received via the second WAN connection to the first client device via the first LAN connection in block 658, and bill the first client device at a first rate for any corresponding, routed data traffic associated with the second WAN connection in optional block 660. The operations in blocks 656-660 may be similar to the operations of blocks 462-466 described, except that instead of routing data associated with the first client device to and from the first subscription, the softAP computing device may avoid causing a loss of service for the first client device by using the second subscription.

In response to performing the operations of optional block 660 or the operations of blocks 462-466, the processor of the softAP computing device may determine whether the second WAN connection is out-of-service in determination block 654'. The operations of determination block 654' may be in relation to the second client device connected to the softAP computing device via the second LAN connection. The operations of determination block 654' may be similar to the operations of determination block 654 described. In some embodiments, the operations of determination block 654' may be optional or otherwise redundant when the softAP computing device has already performed the operations of determination block 654 within a certain time period (e.g., when the service condition of the second subscription was already evaluated due to the first subscription being determined to be out-of-service, etc.).

In response to determining that the second WAN connection is not out-of-service (i.e., determination block 654'="No"), the softAP computing device may perform the operations for transmitting data for the second client device in blocks 468-472 as described.

In response to determining that the second WAN connection is out-of-service (i.e., determination block 654'="Yes"), the processor of the softAP computing device may determine whether the first WAN connection is out-of-service in determination block 652'. The operations of determination block 652' may be similar to the operations of determination block 652 described. In some embodiments, the operations of determination block 652' may be optional or otherwise redundant when the softAP computing device has already performed the operations of determination block 652 within a certain time period (e.g., when the service condition of the first subscription was already evaluated, etc.).

In response to determining that the first WAN connection is out-of-service (i.e., determination block 652'="Yes"), the softAP computing device may perform the wait operations in optional block 680 and continue with the operations in determination block 652 as described in relation to the first client device connected to the softAP computing device via the first LAN connection.

In response to determining that the first WAN connection is not out-of-service (i.e., determination block 652'="No"), the processor of the softAP computing device may route data traffic received from the second client device via the second LAN connection to the first WAN connection in block 670, route data traffic received via the first WAN connection to the second client device via the second LAN connection in block 672, bill the second client device at a second rate for any corresponding, routed data traffic associated with the first WAN connection in optional block 674. The operations in blocks 670-674 may be similar to the operations of blocks 468-472, except that instead of routing data associated with the second client device to and from the second subscription, the softAP computing device may avoid causing a loss of service for the second client device by using the first subscription. The softAP computing device may then continue with the operations in determination block 652 in relation to the first client device connected to the softAP computing device via the first LAN connection.

Figure 7:
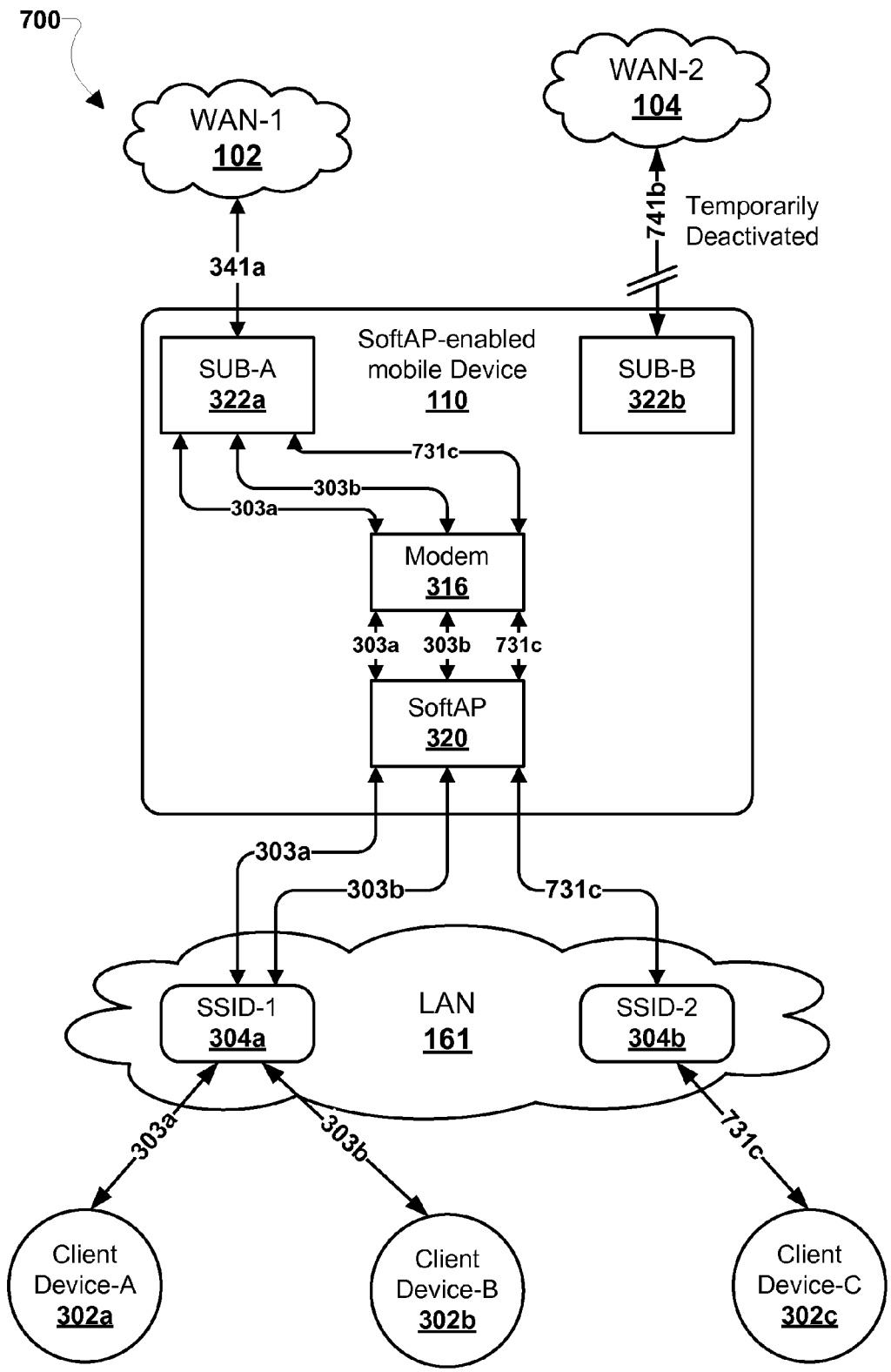
FIG. 7 is a diagram of various data traffic flows routed by a software-enabled access point computing device (or softAP computing device) capable of providing WAN access via WAN subscriptions to various client devices connected to the softAP computing device via a local area network based on bandwidth availability according to various embodiments.

FIG. 7 illustrates a diagram 700 of various data traffic flows routed by a software-enabled access point computing device (or softAP computing device 110) capable of providing WAN access via WAN subscriptions to various client devices 302a, 302b, 302c connected to the softAP computing device 110 via the local area network 161. According to various embodiments, the softAP computing device 110 may be similar to the computing device 110 as described with reference to FIGS. 1-3 and 5. With reference to FIGS. 1-7, the diagram 700 is similar to the diagram 300 described, except that the diagram 700 illustrates how data traffic may be re-routed to one subscription in response to the softAP computing device 110 determining that the WAN connection of one subscription has available bandwidth that may be used for data traffic of other subscriptions.

For example, the bandwidth usage of the first WAN connection 341a via SUB-A 322a may go below a predefined threshold, enabling the softAP computing device 110 to cause a second WAN connection 741b to be deactivated (or temporarily deactivated). In response, the softAP module 320 may re-route data traffic originally directed to SUB-B 322b to be handled by SUB-A 322a. For example, data traffic 731c related to the third client device 302c may be re-routed through the modem 316 to SUB-A 322a in response to SUB-A 322a being identified as utilizing (or under-utilizing) the available bandwidth of the first WAN connection 341a in a particular manner. In other words, instead of communicating with the second WAN 104 via the second subscription, the third client device 302c may be enabled, via the softAP module 320, to exchange data with the first WAN 102 in order to enable the softAP computing device 110 to conserve power by deactivating SUB-B 322b and its associated resources.

In various embodiments, the third client device 302c and second client device 302b may return to exchanging data with the second WAN 104 in response to the softAP module 320 determining that the use of the first WAN connection 341a due to the added data traffic 731c has exceeded a predefined threshold. In various embodiments, data traffic may be re-routed to any WAN connection based on available bandwidth and/or predefined rule sets stored within the softAP computing device.

Figure 8A:
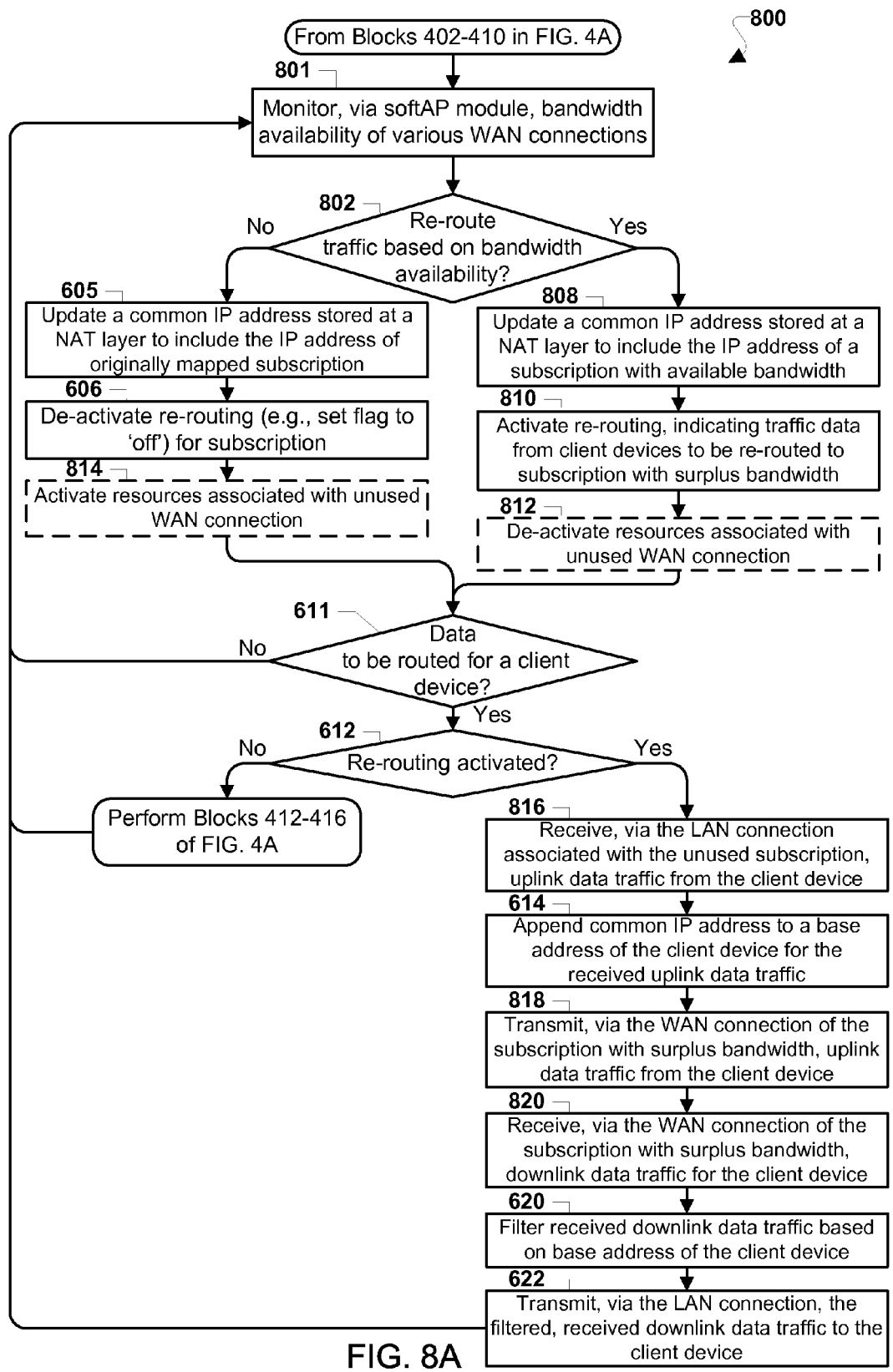
FIG. 8A is a process flow diagram illustrating a method for a softAP-enabled computing device to re-route data based on bandwidth availability of the various subscriptions supported by the SoftAP computing device according to various embodiments.

FIG. 8A illustrates a method 800 for a softAP-enabled computing device to re-route data based on bandwidth availability of the various subscriptions supported by the SoftAP computing device according to various embodiments. The method 800 may be performed by a softAP computing device processor (e.g., the general processor 206 or baseband modem processor 216 as described with reference to FIG. 2) executing a softAP module 320 (FIG. 3). The method 800 is similar to the methods 400 (FIG. 4A) and 600 (FIG. 6A) described, except that the method 800 may include operations for monitoring the bandwidth availability of various subscriptions of the softAP computing device to determine whether data traffic from various LAN connections may be temporarily consolidated in order to improve utilization of device resources, such as power consumption and bandwidth via various subscriptions. For example, when it is determined that one LTE subscription can support the data traffic for all LAN client devices at a given time, a GSM subscription may not be used. In various embodiments, the softAP computing device may be configured to set data (e.g., flags, modes, state variables, etc.) in response to determining re-routing may be performed based on available bandwidth on at least one of the available subscriptions' WAN connections. In other words, the softAP computing device may be configured to cause switches between the use of subscriptions of the softAP computing device when the WAN connections of the subscriptions can support different data traffic loads to improve resource consumption of the softAP computing device. In this way, the functioning of the softAP computing device may be improved by reducing operating costs required to maintain multiple active subscriptions.

With reference to FIGS. 1-8A, after performing the operations of blocks 402-416 (e.g., as described with reference to FIG. 4A), the processor of the softAP computing device, executing a softAP module, may monitor bandwidth availability of the various WAN connections of the subscriptions supported by the softAP computing device in block 801. The softAP computing device may measure and evaluate measurements indicating the bandwidth for the various WAN connections associated with the subscriptions of the softAP computing device, and may compare the actual use of the WAN connections for data transfer to the potential data transfer at a given time. For example, the softAP computing device may compare a total bandwidth of a first WAN connection to the use of the first WAN connection by LAN client devices over a period of time to evaluate whether additional data traffic can be supported on the first WAN connection.

In some embodiments, the softAP computing device may evaluate the bandwidth availability of various WAN connections based on received events indicating the number of client devices connected to the various LAN connections. In other words, monitoring bandwidth availability may include evaluating events that indicate the usage of the various WAN connections. For example, the softAP computing device may determine (via the softAP module) that notifications or events have been received from user space daemons (e.g., 'AP_STA_CONNECTED' or 'AP_STA_DISCONNECTED' events from hostapd) or the kernel ('RTM_NEWLINK', 'RTM_DELLINK', 'RTM_NEWNEIGH', 'RTM_DELNEIGH' events), and from such received events may track the total number of client devices connected to various LAN connections at a given time. In particular, the softAP computing device may utilize a stored table that indicates client devices and the LAN connections they are connected to at a given time.

The softAP computing device may also store threshold values for maximum and/or minimum numbers of client devices for each LAN connection (or their associated WAN connections). The softAP computing device may be configured to compare the total number of client devices connected to the various LAN connections to such threshold values to determine whether any WAN connection is being underused or overused. For example, when there are only few client devices connected to a first SSID (e.g., determined based on received kernel events), the softAP computing device may determine that the WAN connection associated with the first SSID is being underused and therefore may take action to add to that WAN connection support for client device data traffic from another SSID. Such threshold values may be set by administrators or other users of the softAP computing device, and may indicate the number of client devices that can be supported on a WAN connection (or subscription) based on the bandwidth available on that WAN connection and a minimum limit of bandwidth used by each client device.

In some embodiments, the softAP computing device may be configured to identify a LAN interface (e.g., 'wlan1') associated with an encountered event based on a mapping of an SSID associated with that LAN interface, and determine the usage of a WAN connection associated with the identified LAN interface using that identification.

In determination block 802, the processor of the softAP computing device may determine whether to re-route traffic based on the bandwidth availability based on the monitoring operations. In other words, the softAP computing device may identify whether at least one subscription (and its WAN connection) that can be deactivated to enable another subscription (and its WAN connection) to be used for data traffic intended for both the WAN connections. For example, the softAP computing device may compare actual use of a first WAN connection associated with a first subscription to a predefined threshold value, such as a maximum or minimum number of connected client devices, or a predefined percentage of use of the bandwidth. When the actual use of the WAN connection is less than the predefined threshold value, the softAP computing device may determine that the WAN connection may be capable of handling additional data traffic from other LAN client devices not currently using or otherwise associated with the WAN connection.

For example, the softAP computing device may determine whether to re-route data to one of a plurality of WAN connections by comparing the number of client devices connected to each of the plurality of LAN connections supported by the softAP computing device to threshold values related to the plurality of WAN connections to determine whether any of the plurality of the WAN connections is being either underused or overused. The softAP computing device may determine whether to use one of the plurality of WAN connections over a WAN connection originally assigned to data traffic of a certain LAN connection based on the comparisons. In particular, the softAP computing device may determine to re-route traffic to a WAN connection when such comparisons indicate that the number of client devices currently connected to the WAN connection is below a threshold and thus the WAN connection is being underused. Alternatively, comparisons of usage to maximum usage thresholds of one WAN connection indicating that that WAN connection is being overused may cause the softAP computing device to re-route data traffic from client devices away from that WAN connection and to another WAN connection that has available bandwidth.

In some embodiments, the softAP computing device may determine whether to re-route data traffic from a second WAN connection to a first WAN connection when the data traffic over the second WAN connection may be supported by the first WAN connection without degrading the user experience to the current client devices of the first WAN connection. For example, the softAP computing device may measure the data traffic for the second WAN connection and the data traffic for the first WAN connection for a period of time, estimate the impact both the sets of data traffic in combination would have on the first WAN connection, and determine whether such a combination would cause the bandwidth or data of the first WAN connection to be lower than a minimum acceptable level. In this way, the softAP computing device may estimate whether re-routing traffic may be acceptable to current users of a WAN connection.

In response to determining that re-routing of data traffic can be performed based on the bandwidth availability (i.e., determination block 802="Yes"), the processor of the softAP computing device may update a common (or public) IP address stored at a NAT layer to include the IP address of a subscription with available bandwidth in block 808. The operations of block 808 are similar to the operations of block 608 described, except the softAP computing device may update the common IP address with the address of the subscription with the available bandwidth instead of a subscription in-service in response to detecting an out-of-service condition.

In block 810, the processor of the softAP computing device may activate re-routing, such as by setting a flag or other stored data, indicating traffic data from client devices to be re-routed to subscription with surplus bandwidth. The operations in block 810 are similar to the operations of block 610 described, except that the operations in block 810 may cause an activation (e.g., activation of a policy) that indicates re-routing may be done in order to utilize the subscription with the surplus bandwidth.

In optional block 812, the processor of the softAP computing device may de-activate resources associated with the unused WAN connection, such as by de-energizing or otherwise causing a radio chain to limit its consumption of energy. Deactivation operations may include placing the resources associated with a certain subscription in de-energized, sleep, or paused states that may utilize minimal or no energy. The operations of optional block 812 may be optional as the resources may already be de-activated based on previous iterations of the operations of the method 800. The softAP computing device may then continue with the operations in determination block 611 as described.

In response to determining that re-routing of data traffic cannot be performed based on the bandwidth availability (i.e., determination block 802="No"), as described, the softAP computing device may update a common IP address stored at the NAT layer to include the IP address of originally mapped subscription in block 605 and may de-activate re-routing (e.g., set flag to 'off', reset a policy, etc.) for the subscription in block 606.

In optional block 814, the processor of the softAP computing device may activate resources associated with the unused WAN connection, such as be energizing and/or otherwise preparing the radio chain to be capable of receiving and transmitting signals corresponding to the unused WAN connection. The operations of optional block 814 may be optional as the resources may already be activated based on previous iterations of the operations of the method 800 or as a default configuration of the resources.

The softAP computing device may determine whether there is data to route in determination block 611 as described. In response to determining that there is data to be routed for the client device (i.e., determination block 611="Yes"), the processor of the softAP computing device may determine whether re-routing is activated for the data associated with the client device in determination block 612 as described. In response to determining that the re-routing is not activated (i.e., determination block 612="No"), the softAP computing device may perform the operations of blocks 412-416 (e.g., FIG. 4A) as described.

In response to determining that the re-routing is activated (i.e., determination block 612="Yes"), the processor of the softAP computing device may receive, via the LAN connection associated with the unused subscription, uplink data traffic from the client device in block 816, such as data requests (e.g., website requests, download requests, etc.) or other messages (e.g., emails, video calls, etc.) to be sent to remote devices via a WAN connection. In block 614, the processor of the softAP computing device may append the common IP address to a base address of the client device for the received uplink data traffic, as described. In block 818, the processor of the softAP computing device may transmit, via the WAN connection of the subscription with the surplus bandwidth, uplink data traffic from the client device. In block 820, the processor of the softAP computing device may receive, via the WAN connection of the subscription with the surplus bandwidth, downlink data traffic for the client device. As described, in block 620, the processor of the softAP computing device may filter the received downlink data traffic based on the base address of the client device, and may transmit, via the LAN connection associated with the client device having the base address, the filtered, received downlink data traffic to the client device in block 622. The softAP computing device may then continue with the monitoring operations in block 801.

In various embodiments, the softAP computing device may be configured to throttle the data traffic related to client device during the performance of the operations of blocks 816, 614, 818, 820, 620, 622. In other words, the softAP computing device may slow or increase the data rate, decrease or increase the bandwidth available for use, and/or otherwise adjust the transmission capabilities of the data traffic related to the client device (e.g., incoming data as downlinks, outgoing data as uplinks, etc.) in order to ensure fairness between users who have intentionally chosen to use the various subscriptions. For example, the softAP computing device may allow certain data traffic from a first client device connected to a first SSID associated with a slow GSM subscription in order to prevent degradation of experience to a second client device connected to a second SSID associated with a fast LTE subscription.

Parameters for such throttling may be determined by the characteristics of the de-activated resources (e.g., now unused subscription) or the used subscription (e.g., the subscription now received data traffic from all client devices, etc.). For example, the softAP computing device may delimit the access, speed, data rate, and other utility of a first WAN connection in order to constrain a client device's experience to how it would likely be over a now de-activated second WAN connection that client device intended to utilize. For example, regardless of a higher possible data rate on the first WAN connection, the softAP computing device may cause the second client device to utilize the first WAN connection at the average data rate of the second WAN connection. Such downgrading of service on the used WAN connection may ensure fairness between users who have chosen to pay higher costs to access the faster or otherwise superior WAN connections and those users who have been passively re-routed to those WAN connections.

Figure 8B:
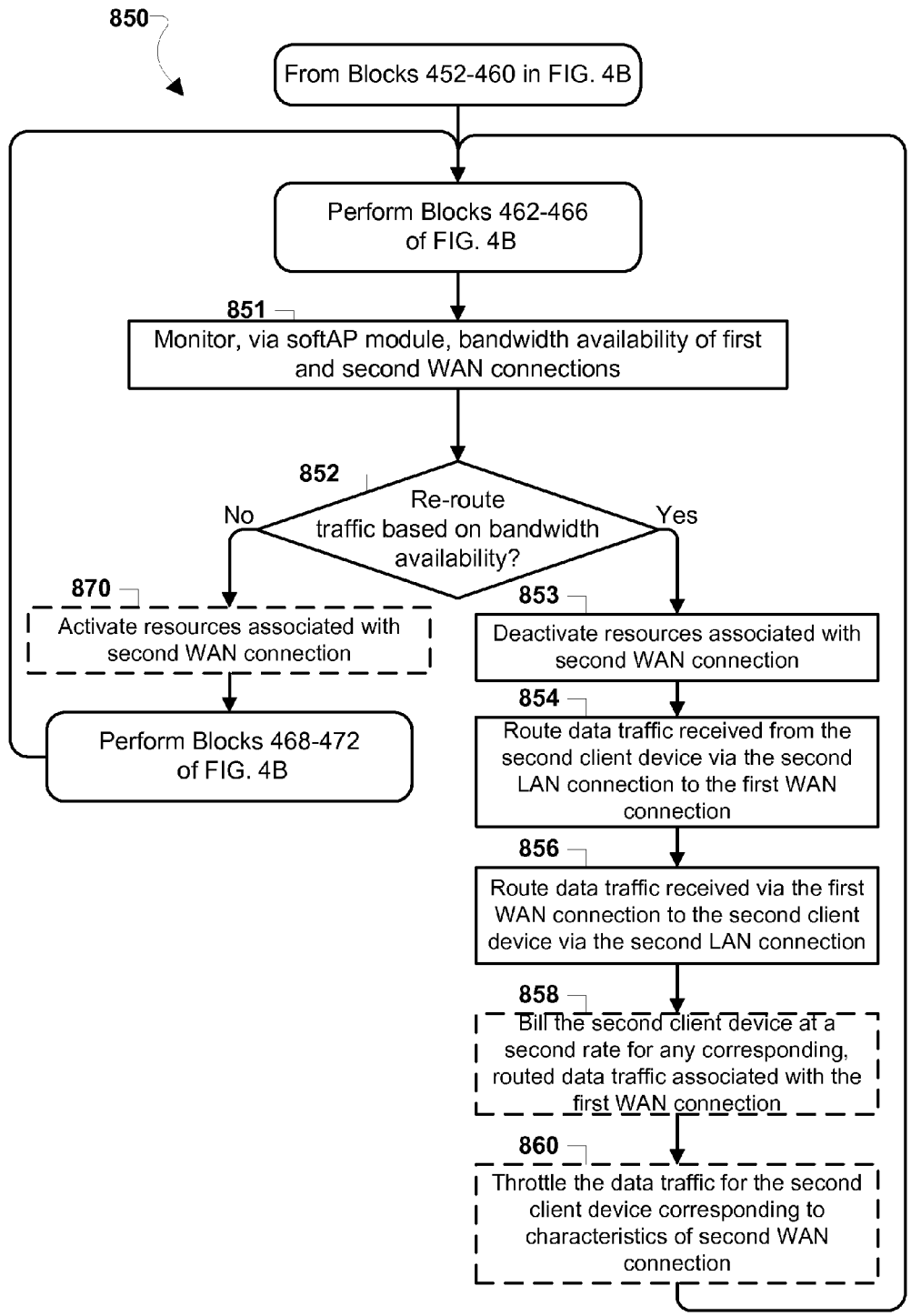
FIG. 8B is a process flow diagram illustrating a method for a softAP-enabled computing device to route data associated with a second subscription to a first subscription based on bandwidth availability of the first subscription according to various embodiments.

FIG. 8B illustrates a method 850 for a softAP-enabled computing device to route data associated with a second subscription to a first subscription based on bandwidth availability of the first subscription according to various embodiments. The method 850 may be performed by a softAP computing device processor (e.g., the general processor 206 or baseband modem processor 216 as described with reference to FIG. 2) executing a softAP module 320 (FIG. 3). The method 850 is similar to the methods 450 (FIG. 4B) and 800 (FIG. 8A) described, except that the method 850 may include operations for monitoring the bandwidth availability of various subscriptions of the softAP computing device to determine whether data traffic from various LAN connections may be consolidated with respect to exemplary first and second client devices, LAN connections, subscriptions, and WAN connections.

With reference to FIGS. 1-8B, after performing the operations of blocks 452-460 (e.g., as described with reference to FIG. 4B), the processor of the softAP computing device, executing a softAP module, may monitor bandwidth availability of the first and second WAN connections supported by the first and second subscriptions of the softAP computing device in block 851, similar to the operations of block 801 as described.

In determination block 852, the processor of the softAP computing device may determine whether to re-route traffic from the second WAN connection based on the bandwidth availability of the first WAN connection based on the monitoring operations, similar to the operations in determination block 802 as described. In response to determining to re-route traffic based on the bandwidth availability (i.e., determination block 852="Yes"), the processor of the softAP computing device may deactivate a second WAN connection and its associated resources in block 853, such as services, modules, and other components associated with the second subscription. For example, the softAP computing device may perform operations to de-energize a radio chain associated with the second subscription. In other words, as a result of the deactivation of the second WAN connection no transmissions may be received or transmitted via the second WAN connection.

In block 854, the processor of the softAP computing device may route data traffic received from the second client device via the second LAN connection to the first WAN connection. For example, the softAP computing device may support an uplink to a cellular network via the first WAN connection in order to transmit data requests from a client device connected to the LAN via the second LAN connection (e.g., a second SSID).

In block 856, the processor of the softAP computing device may route data traffic received via the first WAN connection to the second client device via the second LAN connection. For example, data received from the first WAN connection may be routed to a client device connected to the LAN via a second SSID that was not originally associated with the first WAN connection.

In optional block 858, the processor of the softAP computing device may bill the second client device at a second rate for any corresponding, routed data traffic associated with the first WAN connection. In other words, despite utilizing the first WAN connection, the second client device may only be charged at the rate of the second WAN connection it are originally associated with. In other words, the client devices may only be charged by the softAP computing devices for the service or connection quality/speed they originally bargained for by selecting the second LAN connection. However, in some embodiments, the softAP computing device may bill the second client device at the rate for the first WAN connection for the actual data traffic transmitted over the first WAN connection.

In optional block 860, the processor of the softAP computing device may throttle the data traffic for the second client device corresponding to characteristics of second WAN connection. In other words, the softAP computing device may delimit the access, speed, data rate, and other utility of the first WAN connection in order to constrain the second client device's experience to how it would likely be over the second WAN connection. For example, regardless of a higher possible data rate on the first WAN connection, the softAP computing device may cause the second client device to utilize the first WAN connection at the average data rate of the second WAN connection. Such downgrading of service on the first WAN connection may ensure fairness between users who have chosen to pay higher costs to access the first WAN connection and those users who have been passively re-routed to the first WAN connection. The softAP computing device may then perform the routing operations in block 462 as described.

In response to determining not to re-route traffic based on the bandwidth availability (i.e., determination block 852="No"), the processor of the softAP computing device may activate the resources associated with the second WAN connection (and the second subscription) in optional block 870 and may perform the operations in blocks 468-472 as described. The softAP computing device may then perform the routing operations in block 462 as described.

Figure 9:
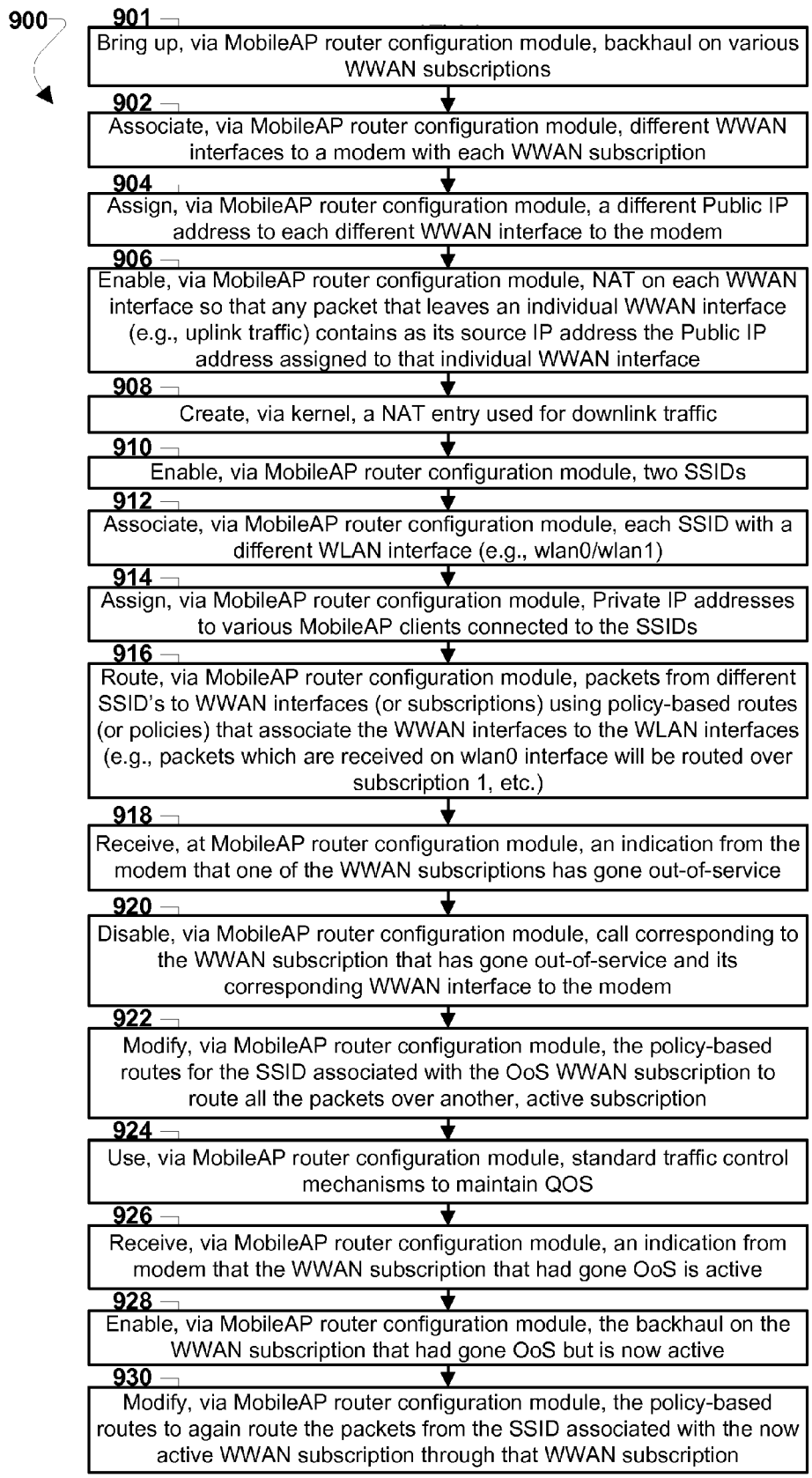
FIG. 9 is a process flow diagram illustrating a method for a softAP computing device to route data associated with various LAN connections over various WAN connections according to various embodiments.

FIG. 9 illustrates a method 900 for a softAP computing device to route data associated with various LAN connections over various WAN connections according to various embodiments, thereby improving experiences of client devices connected to various service set identifiers (SSIDs) provided by the softAP computing device. The method 900 may include operations similar to those described elsewhere herein but may be a more common algorithm capable of being used in various implementations. The method 900 may be performed by a softAP computing device processor (e.g., the general processor 206 or baseband modem processor 216 as described with reference to FIG. 2) executing various modules. In particular, the softAP computing device may execute a MobileAP router configuration module that may be responsible for bringing up backhauls on various subscriptions supported by the softAP computing device. In various embodiments, such a MobileAP router configuration module may include, be included within, or function similar to a softAP module 320 as referenced in FIGS. 3, 5, and 7.

With reference to FIGS. 1-9, the softAP computing device, via the MobileAP router configuration module executing on the softAP computing device processor, may bring up backhauls on various wireless wide area network (WWAN) subscriptions in block 901. In block 902, the softAP computing device, via the MobileAP router configuration module executing on the softAP computing device processor, may associate different WWAN interfaces to a modem of the softAP computing device with each WWAN subscription supported by the softAP computing device. In block 904, the softAP computing device, via the MobileAP router configuration module executing on the softAP computing device processor, may assign a different Public IP address to each of the different WWAN interfaces to the modem.

In block 906, the softAP computing device, via the MobileAP router configuration module executing on the softAP computing device processor, may enable network address translation (NAT) (or NAT functionalities) on each WWAN interface so that any packet that leaves (e.g., is transmitted as uplink data traffic) an individual WWAN interface may be configured via the enabled NAT functionalities to contain as its source IP address the Public IP address assigned to that individual WWAN interface. In block 908, the softAP computing device, via its kernel (e.g., operating system routines, etc.) executing on the softAP computing device processor, may create a NAT entry used for downlink traffic. For example, the kernel may generate a NAT entry for each WWAN interface, linking the WWAN interface to a LAN interface or SSID.

In block 910, the softAP computing device, via the MobileAP router configuration module executing on the softAP computing device processor, may enable (or "bring-up") two service set identifiers (SSIDs), and may associate each SSID with a different wireless local area network (WLAN) interface (e.g., wlan0/wlan1) in block 912. In block 914, the softAP computing device, via the MobileAP router configuration module executing on the softAP computing device processor, may assign Private IP addresses to various client devices (e.g., "MobileAP clients") connected to the SSIDs of the softAP computing device.

In block 916, the softAP computing device, via the MobileAP router configuration module executing on the softAP computing device processor, may route packets from different SSIDs to WWAN interfaces (or WWAN subscriptions) using policy-based routes (or policies) that associate the WWAN interfaces (and/or subscriptions) to the WLAN interfaces (and/or SSIDs). In other words, the softAP computing device may route packets to particular WWAN interfaces or subscriptions based on the WLAN interface on which the packets are received. For example, packets that are received on a first WLAN interface (e.g., 'wlan0') may be routed over a first subscription (e.g., 'subscription 1'), packets that are received on a second WLAN interface (e.g., 'wlan1') may be routed over a second subscription (e.g., 'subscription 2'), etc.

In block 918, the softAP computing device, via the MobileAP router configuration module executing on the softAP computing device processor, may receive an indication from the modem that one of the WWAN subscriptions has gone out-of-service. In block 920, the softAP computing device, via the MobileAP router configuration module executing on the softAP computing device processor, may disable (or "bring down") a call corresponding to the WWAN subscription that has gone out-of-service (or "OoS") and its corresponding WWAN interface to the modem.

In block 922, the softAP computing device, via the MobileAP router configuration module executing on the softAP computing device processor, may modify the policy-based routes (or policy) for the SSID (and/or its WLAN interface) associated with the out-of-service WWAN subscription (i.e., the WWAN subscription that has gone out-of-service) to route all packets related to that SSID (and/or its WLAN interface) over another, active subscription. This may ensure privileged client devices using the SSID may not experience disruption in services. In block 924, the softAP computing device, via the MobileAP router configuration module executing on its processor, may use standard traffic control mechanisms to maintain quality of service (QOS).

In block 926, the softAP computing device, via the MobileAP router configuration module executing on the softAP computing device processor, may receive an indication from the modem that the WWAN subscription that had gone out-of-service (i.e., the OoS WWAN subscription) is now active. In block 928, the softAP computing device, via the MobileAP router configuration module executing on the softAP computing device processor, may enable (or "bring up") the backhaul on that WWAN subscription that had gone out-of-service but is now active. In block 930, the softAP computing device, via the MobileAP router configuration module executing on the softAP computing device processor, may modify the policy-based routes (or policies) to again route the packets from the SSID associated with the now active WWAN subscription through the now active WWAN subscription. In other words, the policy-based routes (or policies) may be modified via the MobileAP router configuration module to once again route packets from client devices using the WLAN interface (via its SSID) that is associated with the WWAN subscription that had gone out-of-service but is now active through that WWAN subscription.

Figure 10A:
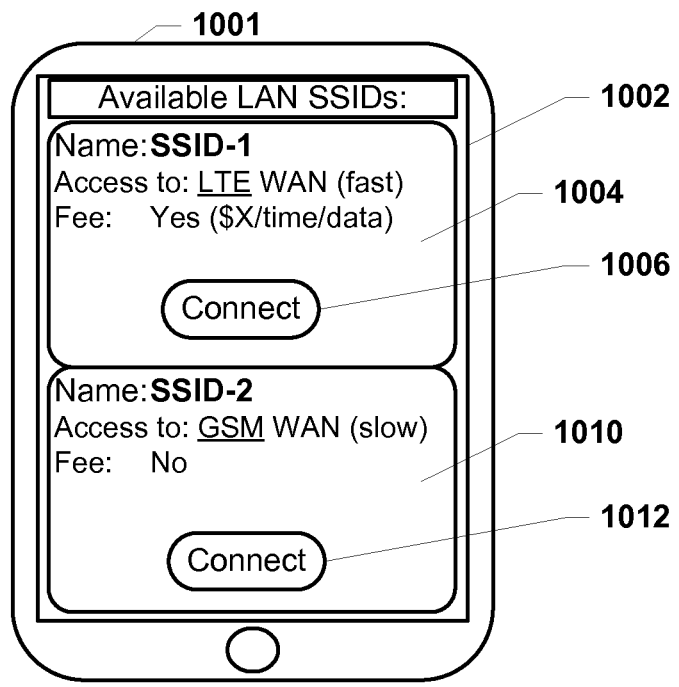
FIGS. 10A-10B are component block diagrams illustrating exemplary graphical user interfaces for an exemplary client device to select from a plurality of LAN connections (e.g., SSIDs) associated with various WAN connections supported by a softAP computing device according to various embodiments.
Figure 10B:
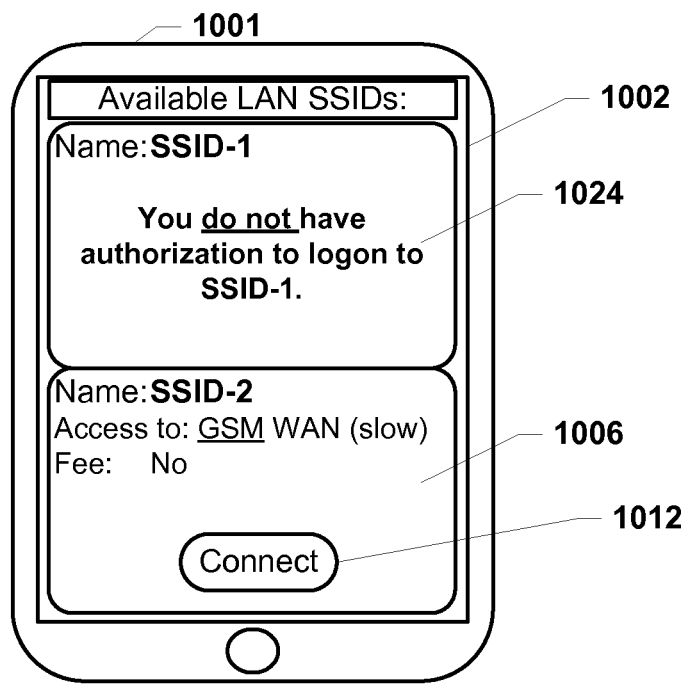

FIGS. 10A-10B illustrate embodiment graphical user interfaces for an exemplary client device 1001 to select from a plurality of LAN connections (e.g., SSIDs) associated with various WAN connections, both supported by a softAP computing device (e.g., 110 in FIGS. 1-3, 5, and 7). FIG. 10A shows the exemplary client device 1001 (e.g., a smartphone) capable of connecting to a local area network provided by a softAP computing device as described. For example, the client device 1001 may include a Wi-Fi transceiver capable of connecting to the softAP computing device via Wi-Fi communications. The client device 1001 may include a display 1002 capable of rendering various data, such as graphical user interfaces, messages, and other information. In particular, the client device 1001 may be configured to execute a LAN connection application or service that may include a graphical display of available LAN connections. For example, the client device 1001 may be configured to render a graphical user interface that includes a first dialog box 1004 indicating a first LAN connection having a name "SSID-1". The first dialog box 1004 may also include information indicating the first LAN connection is associated with (or provides access to) a fast LTE WAN connection and that connecting to the first LAN connection may cause the user of the client device 1001 to be charged a fee, such as a fee based on the amount of time the client device 1001 was connected to the LAN connection, the amount of data transferred/received, or a flat fee. The first dialog box 1004 may also include a graphical user interface (GUI) button 1006 for connecting to the first LAN connection, and thus accepting the terms associated with such a connection (e.g., billing rates).

In various embodiments, the first dialog box 1004 also include other information indicating the various terms of use for the first LAN connection, such as notices that the softAP computing device may cause the first WAN connection to be shared with non-paying customers, pro-rate access to the first WAN connection, re-route data traffic from the first WAN connection, and other operations to manage data traffic. Such other information may be rendered in the first dialog box 1004 or alternatively in subsequent screens or dialog boxes in response to the user of the client device 1001 providing user inputs on the graphical user input button 1006 indicating a desire to connect to the first LAN connection. For example, a confirmation message or window with terms information/conditions may be rendered after the user presses the "connect" GUI button 1006.

The client device 1001 may also be configured to render a second dialog box 1010 indicating a second LAN connection having a name "SSID-2". The second dialog box 1010 may also include information indicating the second LAN connection is associated with (or provides access to) a cheap (e.g., free), but slow GSM WAN connection. Similar to the first dialog box 1004, the second dialog box 1010 may include a graphical user interface button 1012 for connecting to the second LAN connection.

FIG. 10B shows another embodiment user interface rendered on the exemplary client device 1001. As described, the softAP computing device supporting the various LAN connections and WAN connections that may be accessed by the client device 1001 may store authorizations or other stored data indicating the identities of devices that are permitted to access particular LAN and/or WAN connections. Accordingly, in some embodiments, the client device 1001 may render a GUI dialog box 1024 that indicates the client device 1001 does not have the proper authorization to connect to the first LAN connection.

Figure 11:
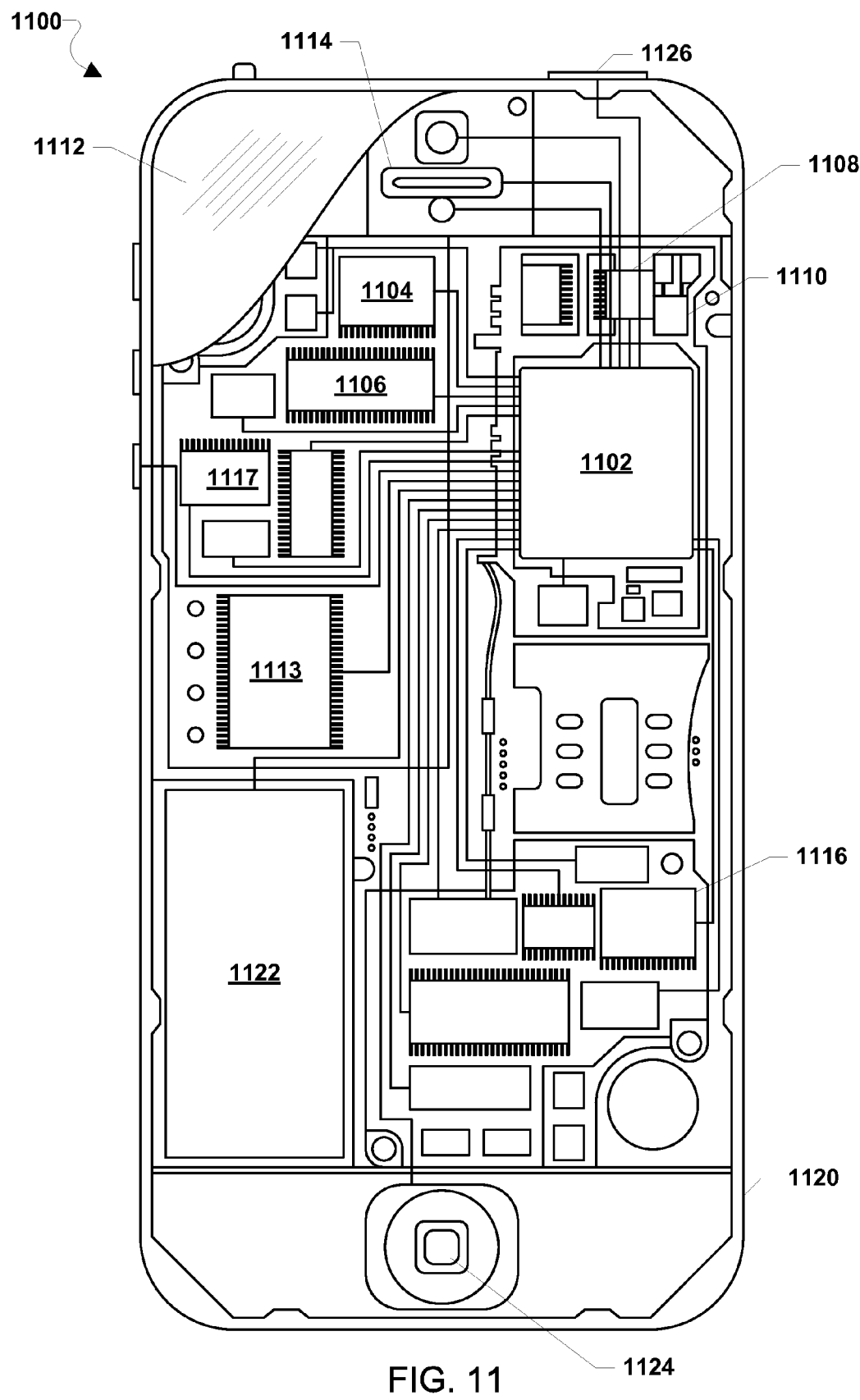
FIG. 11 is a component block diagram of a mobile computing device suitable for use with various embodiments.

Various embodiments may be implemented in any of a variety of mobile devices, an example of which (e.g., mobile device 1100) is illustrated in FIG. 11. According to various embodiments, the mobile device 1100 may be similar to the computing device 110 as described with reference to FIGS. 1-3, 5, and 7. As such, the mobile device 1100 may be capable of implementing the methods 400, 600, 650, 800, 850, and 900 in FIGS. 4, 6A, 6B, 8A, 8B, and 9. Additionally, the mobile device 1100 may be capable of operating as a client device as described herein, and thus may also be capable of implementing the embodiments of FIGS. 10A-10B.

Thus, with reference to FIGS. 1-11, the mobile device 1100 may include a processor 1102 coupled to a touch screen controller 1104 and an internal memory 1106. The processor 1102 may be one or more multi-core integrated circuits designated for general or specific processing tasks. The internal memory 1106 may be volatile or non-volatile memory, and may also be secure and/or encrypted memory, or unsecure and/or unencrypted memory, or any combination thereof. The touch screen controller 1104 and the processor 1102 may also be coupled to a touch screen panel 1112, such as a resistive-sensing touch screen, capacitive-sensing touch screen, infrared sensing touch screen, etc. Additionally, the display of the mobile device 1100 need not have touch screen capability.

The mobile device 1100 may have one or more cellular network transceivers 1108 coupled to the processor 1102 and one or more antennae 1110 and configured for sending and receiving cellular communications. The transceivers 1108 and the antennae 1110 may be used with circuitry mentioned herein to implement various embodiment methods. The mobile device 1100 may include one or more SIM cards (e.g., SIM 1113) coupled to the transceivers 1108 and/or the processor 1102 and configured as described. The mobile device 1100 may include one or more cellular network wireless modem chips 1117 that enables communication via one or more cellular networks and is coupled to the processor 1102. In some embodiments, the mobile device 1100 may include a Wi-Fi radio 1116 (or transceiver) coupled to the processor 1102 that enables communications via a Wi-Fi connection.

The mobile device 1100 may also include speakers 1114 for providing audio outputs. The mobile device 1100 may also include a housing 1120, constructed of a plastic, metal, or a combination of materials, for containing all or some of the components discussed herein. The mobile device 1100 may include a power source 1122 coupled to the processor 1102, such as a disposable or rechargeable battery. The rechargeable battery may also be coupled to the peripheral device connection port to receive a charging current from a source external to the mobile device 1100. The mobile device 1100 may also include a physical button 1124 for receiving user inputs. The mobile device 1100 may also include a power button 1126 for turning the mobile device 1100 on and off.

The foregoing method descriptions and the process flow diagrams are provided merely as illustrative examples and are not intended to require or imply that the steps of various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

Various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of these various media are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to some embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for routing data traffic between local area network (LAN) connections of a LAN and wide area network (WAN) connections corresponding to subscriptions of a softAP computing device, comprising:
    storing, by a processor of the softAP computing device, a mapping that associates each of at least two of a plurality of LAN connections for the LAN established by the softAP computing device with a different one of a plurality of WAN connections configured to connect one or more client devices to a different one of a plurality of WANs;
    connecting, by the processor of the softAP computing device, a client device to the LAN via a first LAN connection of the at least two of the plurality of LAN connections;
    routing, by the processor of the softAP computing device, uplink data traffic received from the client device to a first WAN of the plurality of WANs via a first WAN connection of the plurality of WAN connections based on the stored mapping;
    routing, by the processor of the softAP computing device, downlink data traffic received from the first WAN via the first WAN connection to the client device based on the stored mapping;
    determining, by the processor of the softAP computing device, whether to re-route the uplink data traffic to a second WAN of the plurality of WANs via a second WAN connection of the plurality of WAN connections;
    re-routing, by the processor of the softAP computing device, the uplink data traffic received from the client device via the first LAN connection to the second WAN via the second WAN connection in response to determining to re-route the uplink data traffic; and
    limiting, by the processor of the softAP computing device, the uplink data traffic re-routed to the second WAN connection, in response to the second WAN being associated with a faster subscription than the first WAN, by degrading bandwidth available to the uplink data traffic re-routed to the second WAN connection in order to maintain relative operating speed characteristics between the first and second WAN connections.

2. The method of claim 1, further comprising:
    appending, by the processor of the softAP computing device, to the uplink data traffic, which includes a first IP address of the client device, a second IP address associated with the second WAN connection in response to determining to re-route the uplink data traffic;
    receiving, by a modem of the softAP computing device, the downlink data traffic from the second WAN via the second WAN connection;
    determining, by the processor of the softAP computing device, which of the at least two LAN connections to route the downlink data traffic received via the second WAN connection based on the first IP address of the client device; and
    transmitting the identified portions of the downlink data traffic to the client device via the first LAN connection.

3. The method of claim 2, further comprising:
    receiving, by the modem of the softAP computing device, an out-of-service notification that the first WAN connection is out-of-service, wherein determining whether to re-route the uplink data traffic is based on the received out-of-service notification.

4. The method of claim 2, further comprising:
    determining, by the processor of the softAP computing device, whether to further re-route the uplink data traffic to the first WAN via the first WAN connection; and
    updating, by the processor of the softAP computing device, the uplink data traffic to include a third IP address associated with the first WAN connection of the plurality of WAN connections in response to determining to further re-route the uplink data traffic.

5. The method of claim 4, further comprising:
    receiving, by the modem of the softAP computing device, an in-service notification that the first WAN connection has returned to being in-service, wherein determining whether to re-route the uplink data traffic is based on the received in-service notification.

6. The method of claim 1, further comprising:
    monitoring, by the processor of the softAP computing device, bandwidth availability of the plurality of WAN connections, wherein
    determining whether to re-route the uplink data traffic is based on the monitored bandwidth availability; and
    appending, by the processor of the softAP computing device, to the uplink data traffic, which includes a first IP address of the client device, a second IP address associated with the second WAN connection in response to determining to re-route the uplink data traffic.

7. The method of claim 6, wherein monitoring the bandwidth availability of the plurality of WAN connections comprises evaluating events from one of a user space daemon or a kernel.

8. The method of claim 6, further comprising:
    de-activating, by the processor of the softAP computing device, resources associated with the first WAN connection in response to determining to re-route the uplink data traffic based on the monitored bandwidth availability of the first WAN connection.

9. The method of claim 6, wherein determining whether to re-route the uplink data traffic based on the monitored bandwidth availability comprises:
    comparing, by the processor of the softAP computing device, a number of client devices connected to the plurality of LAN connections to threshold values related to the plurality of WAN connections to determine whether any of the plurality of WAN connections is being underused or overused, wherein determining to re-route the uplink data traffic is based on a result of the comparison.

10. The method of claim 1, further comprising:

appending, by the processor of the softAP computing device, to the uplink data traffic a third IP address associated with the first WAN connection of the plurality of WAN connections in response to determining not to re-route the uplink data traffic.

11. The method of claim 10, further comprising:

activating, by the processor of the softAP computing device, resources associated with the first WAN connection in response to determining not to re-route the uplink data traffic.

12. The method of claim 1, wherein degrading the bandwidth availability to the uplink data traffic re-routed to the second WAN connection causes the re-routed uplink data traffic to utilize the second WAN connection at an average data rate of the first WAN connection.

13. The method of claim 1, further comprising billing, by the processor of the softAP computing device, the client device at a rate based on the first LAN connection.

14. The method of claim 1, further comprising storing, by the processor of the softAP computing device, authorization data indicating the at least two of the plurality of LAN connections, wherein connecting the client device to the LAN via the first LAN connection of the at least two of the plurality of LAN connections is permitted by the stored authorization data.

15. A computing device, comprising:

a processor configured with processor-executable instructions to:
store a mapping that associates each of at least two of a plurality of LAN connections for a LAN established by the computing device with a different one of a plurality of WAN connections configured to connect one or more client devices to a different one of a plurality of WANs;
connect a client device to the LAN via a first LAN connection of the at least two of the plurality of LAN connections;
route uplink data traffic received from the client device to a first WAN of the plurality of WANs via a first WAN connection of the plurality of WAN connections based on the stored mapping;
route downlink data traffic received from the first WAN via the first WAN connection to the client device based on the stored mapping;
determine whether to re-route the uplink data traffic to a second WAN of the plurality of WANs via a second WAN connection of the plurality of WAN connections;
re-route the uplink data traffic received from the client device via the first LAN connection to the second WAN via the second WAN connection in response to determining to re-route the uplink data traffic; and
limit the uplink data traffic re-routed to the second WAN connection, in response to the second WAN being associated with a faster subscription than the first WAN, by degrading bandwidth available to the uplink data traffic re-routed to the second WAN connection in order to maintain relative operating speed characteristics between the first and second WAN connections.

16. The computing device of claim 15, wherein the processor is further configured with processor-executable instructions to:

append to the uplink data traffic, which includes a first IP address of the client device, a second IP address associated with the second WAN connection in response to determining to re-route the uplink data traffic;
receive the downlink data traffic from the second WAN via the second WAN connection;
determine which of the at least two LAN connections to route the downlink data traffic received via the second WAN connection based on the first IP address of the client device; and
transmit the identified portions of the downlink data traffic to the client device via the first LAN connection.

17. The computing device of claim 16, wherein the processor is further configured with processor-executable instructions to:

determine whether to further re-route the uplink data traffic to the first WAN via the first WAN connection; and
update the uplink data traffic to include a third IP address associated with the first WAN connection of the plurality of WAN connections in response to determining to further re-route the uplink data traffic.

18. The computing device of claim 15, wherein the processor is further configured with processor-executable instructions to:

monitor bandwidth availability of the plurality of WAN connections, wherein determining whether to re-route the uplink data traffic is based on the monitored bandwidth availability; and
append to the uplink data traffic, which includes a first IP address of the client device, a second IP address associated with the second WAN connection in response to determining to re-route the uplink data traffic.

19. The computing device of claim 18, wherein the processor is further configured with processor-executable instructions to determine whether to re-route the uplink data traffic based on the monitored bandwidth availability by:

comparing a number of client devices connected to the plurality of LAN connections to threshold values related to the plurality of WAN connections to determine whether any of the plurality of WAN connections is being underused or overused, wherein
determining to re-route the uplink data traffic is based on a result of the comparison.

20. The computing device of claim 15, wherein the processor is further configured with processor-executable instructions to:

append to the uplink data traffic a third IP address associated with the first WAN connection of the plurality of WAN connections in response to determining not to re-route the uplink data traffic; and
activate resources associated with the first WAN connection in response to determining not to re-route the uplink data traffic.

21. The computing device of claim 15, wherein the processor is further configured with processor-executable instructions such that degrading the bandwidth availability to the uplink data traffic re-routed to the second WAN connection causes the re-routed uplink data traffic to utilize the second WAN connection at an average data rate of the first WAN connection.

22. The computing device of claim 15, wherein the processor is further configured with processor-executable instructions to bill the client device at a rate based on the first LAN connection.

23. The computing device of claim 15, wherein the processor is further configured with processor-executable instructions to store authorization data indicating the at least two of the plurality of LAN connections,
wherein the processor is further with processor-executable instructions such that connection the client device to the LAN via the first LAN connection of the at least two of the plurality of LAN connections is permitted by the stored authorization data.

24. A non-transitory processor-readable storage medium having stored thereon processor-executable instructions configured to cause a processor of a computing device to perform operations comprising:
storing a mapping that associates each of at least two of a plurality of LAN connections for a LAN established by the computing device with a different one of a plurality of WAN connections configured to connect one or more client devices to a different one of a plurality of WANs;
connecting a client device to the LAN via a first LAN connection of the at least two of the plurality of LAN connections;
routing uplink data traffic received from the client device to a first WAN of the plurality of WANs via a first WAN connection of the plurality of WAN connections based on the stored mapping;
routing downlink data traffic received from the first WAN via the first WAN connection to the client device based on the stored mapping;
determining whether to re-route the uplink data traffic to a second WAN of the plurality of WANs via a second WAN connection of the plurality of WAN connections;
re-routing the uplink data traffic received from the client device via the first LAN connection to the second WAN via the second WAN connection in response to determining to re-route the uplink data traffic; and
limiting the uplink data traffic re-routed to the second WAN connection, in response to the second WAN being associated with a faster subscription than the first WAN, by degrading bandwidth available to the uplink data traffic re-routed to the second WAN connection in order to maintain relative operating speed characteristics between the first and second WAN connections.

25. A computing device, comprising:
means for storing a mapping that associates each of at least two of a plurality of LAN connections for the LAN established by the softAP computing device with a different one of a plurality of WAN connections configured to connect one or more client devices to a different one of a plurality of WANs;
means for connecting a client device to the LAN via a first LAN connection of the at least two of the plurality of LAN connections;
means for routing uplink data traffic received from the client device to a first WAN of the plurality of WANs via a first WAN connection of the plurality of WAN connections based on the stored mapping;
means for routing downlink data traffic received from the first WAN via the first WAN connection to the client device based on the stored mapping;
means for determining whether to re-route the uplink data traffic to a second WAN of the plurality of WANs via a second WAN connection of the plurality of WAN connections;
means for re-routing the uplink data traffic received from the client device via the first LAN connection to the second WAN via the second WAN connection in response to determining to re-route the uplink data traffic; and
means for limiting the uplink data traffic re-routed to the second WAN connection, in response to the second WAN being associated with a faster subscription than the first WAN, by degrading bandwidth available to the uplink data traffic re-routed to the second WAN connection in order to maintain relative operating speed characteristics between the first and second WAN connections.

* * * * *